United States Patent
Lukacs et al.

(10) Patent No.: US 9,507,939 B1
(45) Date of Patent: *Nov. 29, 2016

(54) SYSTEMS AND METHODS FOR BATCH PROCESSING OF SAMPLES USING A BARE-METAL COMPUTER SECURITY APPLIANCE

(71) Applicant: Bitdefender IPR Management Ltd., Nicosia (CY)

(72) Inventors: Sandor Lukacs, Floresti (RO); Adrian V. Colesa, Cluj-Napoca (RO)

(73) Assignee: Bitdefender IPR Management Ltd., Nicosia (CY)

(*) Notice: Subject to any disclaimer, the term of this patent is extended or adjusted under 35 U.S.C. 154(b) by 27 days.

This patent is subject to a terminal disclaimer.

(21) Appl. No.: 14/661,464

(22) Filed: Mar. 18, 2015

Related U.S. Application Data

(60) Provisional application No. 61/955,145, filed on Mar. 18, 2014.

(51) Int. Cl.
*G06F 12/14* (2006.01)
*G06F 21/56* (2013.01)

(52) U.S. Cl.
CPC ....... *G06F 21/562* (2013.01); *G06F 2221/034* (2013.01)

(58) Field of Classification Search
CPC ............................ G06F 21/566; G06F 21/567
USPC ...................................... 726/23–25
See application file for complete search history.

(56) References Cited

U.S. PATENT DOCUMENTS

| | | | |
|---|---|---|---|
| 8,171,554 B2* | 5/2012 | Elovici | H04L 12/2602 713/151 |
| 8,220,053 B1* | 7/2012 | Sun | G06F 21/562 726/24 |
| 8,458,791 B2 | 6/2013 | Do et al. | |
| 8,468,244 B2* | 6/2013 | Redlich | G06Q 10/06 705/50 |
| 8,528,091 B2 | 9/2013 | Bowen et al. | |
| 8,566,930 B2 | 10/2013 | Meagher et al. | |
| 8,832,465 B2 | 9/2014 | Gulati et al. | |
| 9,065,826 B2* | 6/2015 | Colvin | G06F 21/53 |
| 2007/0174910 A1 | 7/2007 | Zachman et al. | |
| 2012/0079596 A1 | 3/2012 | Thomas et al. | |
| 2014/0130157 A1 | 5/2014 | Sallam | |

OTHER PUBLICATIONS

Vomel et al., "A survey of main memory acquisition and analysis techniques for the windows operating system," Digital Investigation, vol. 8, p. 3-22, Elsevier Ltd., Amsterdam, The Netherlands, Jun. 11, 2011.

(Continued)

*Primary Examiner* — Izunna Okeke
*Assistant Examiner* — Hee Song
(74) *Attorney, Agent, or Firm* — Law Office of Andrei D Popovici, PC

(57) ABSTRACT

Described systems and methods allow conducting computer security operations, such as detecting malware and spyware, in a bare-metal computer system. In some embodiments, a first processor of a computer system executes the code samples under assessment, whereas a second, distinct processor is used to carry out the assessment and to control various hardware components involved in the assessment. The described computer systems may be used in conjunction with a conventional anti-malware filter to increase throughput and/or the efficacy of malware scanning.

20 Claims, 16 Drawing Sheets

(56) References Cited

OTHER PUBLICATIONS

Kirat et al., "BareBox: Efficient Malware Analysis on Bare-Metal," Proceedings of the 27th Annual Computer Security Applications Conference, p. 403-412, Association for Computing Machinery, New York, NY, Dec. 2011.

Royal, "Entrapment: Tricking Malware with Transparent, Scalable Malware Analysis," BlackHat Europe, p. 1-27, Mar. 14, 2012.

Garfinkel et al., "A general strategy for differential forensic analysis," Digital Investigation, Proceedings of the Twelfth Annual DFRWS Conference, vol. 9, p. S50-S59, Elsevier Ltd., Amsterdam, The Netherlands, Aug. 2, 2012.

Windows Scope, "CaptureGUARD Overview," BlueRISC Inc., p. 1, Amherst, MA, 2012. The year of publication is sufficiently earlier than the effective U.S. filing date and any foreign priority date so that the particular month of publication is not in issue.

Voom, "Shadow 3: Breakthrough Computer Forensic Analysis Device," Voom Technologies, Inc., p. 1-2, Lakeland, MN, 2013. The year of publication is sufficiently earlier than the effective U.S. filing date and any foreign priority date so that the particular month of publication is not in issue.

Lukacs, U.S. Appl. No. 14/661,423, filed Mar. 18, 2015.

Lukacs, U.S. Appl. No. 14/661,485, filed Mar. 18, 2015.

USPTO, Notice of Allowance mailed May 24, 2016 for U.S. Appl. No. 14/661,423, filed Mar. 18, 2015.

* cited by examiner

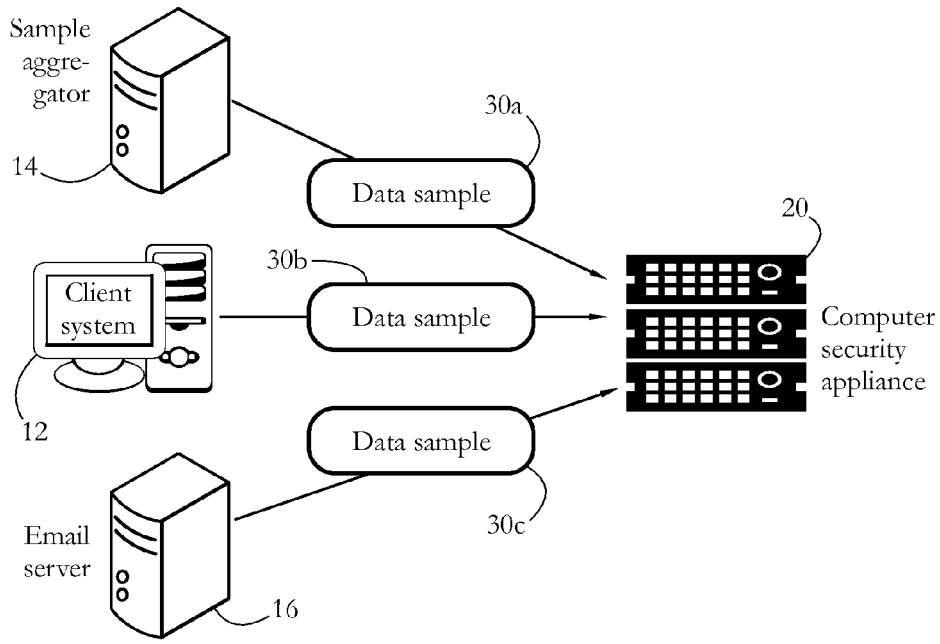
FIG. 2
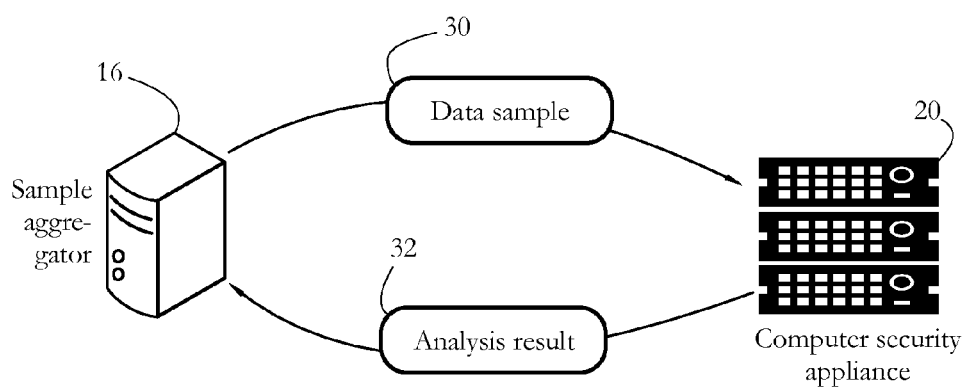
FIG. 3-A

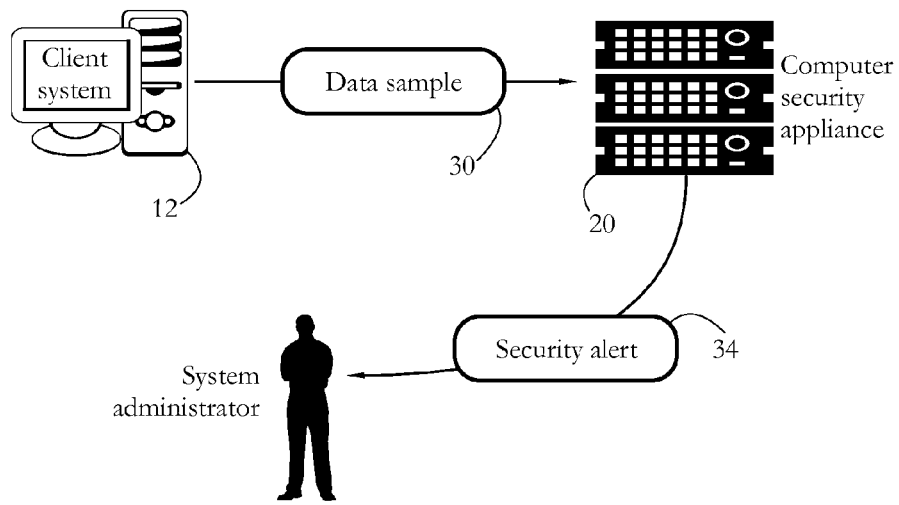
FIG. 3-B
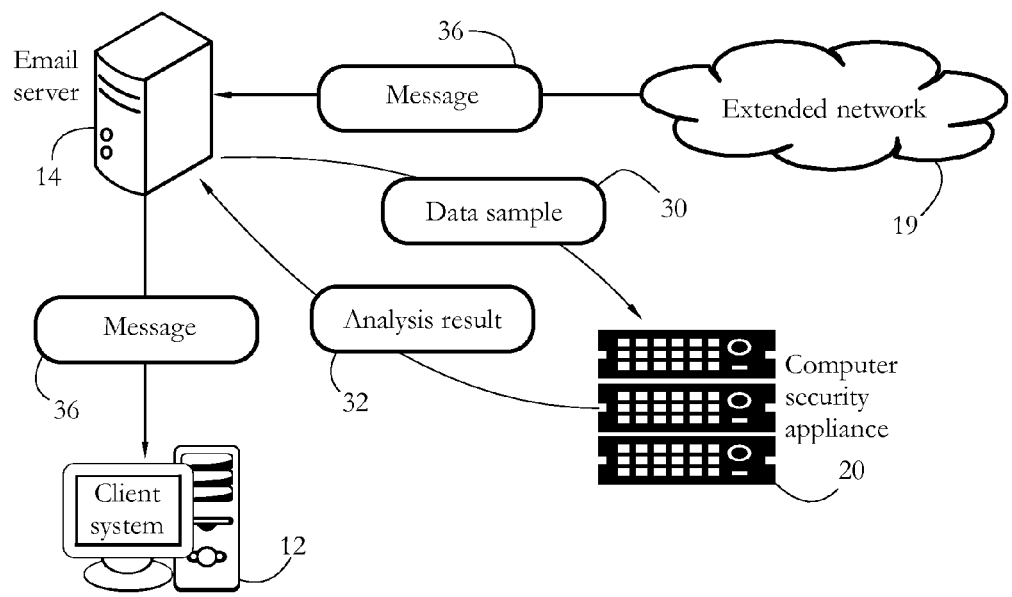
FIG. 3-C

SYSTEMS AND METHODS FOR BATCH PROCESSING OF SAMPLES USING A BARE-METAL COMPUTER SECURITY APPLIANCE

RELATED APPLICATIONS

This application claims the benefit of the filing date of U.S. provisional patent application No. 61/955,145, filed on Mar. 18, 2014, entitled "Bare-Metal Anti-Malware Appliance", the entire contents of which are incorporated by reference herein.

BACKGROUND

The invention relates to computer security, and in particular to hardware-assisted detection of computer security threats such as malware.

Malicious software, also known as malware, affects a great number of computer systems worldwide. In its many forms such as computer viruses, worms, rootkits, and spyware, malware presents a serious risk to millions of computer users, making them vulnerable to loss of data and sensitive information, identity theft, and loss of productivity, among others.

In recent years, malware attacks are increasingly targeting corporate networks, for instance to extract sensitive corporate data. In one example known as a spear-phishing attack, an attacker sends an email to an employee of a particular corporation, the email containing an attached PDF file. The PDF file is carefully crafted to contain an exploit for a vulnerability of Adobe Acrobat® software, the exploit being able—once triggered—to download a backdoor service to the respective employee's computer. The backdoor service may allow the attacker to connect to the respective computer, and to use it as an entry point to the corporate network.

Modern computer security operations commonly include automated malware analysis. Computer security providers receive a large number (sometimes hundreds of thousands) of malware samples every day. To process such substantial amounts of data, the company may set up an automated analysis system comprising tens or hundreds of computing nodes configured to employing various detection technologies to process a continuous flux of samples. Such systems typically have databases to store samples and analysis results, one or more controller/scheduler systems, and a user interface allowing operators to control operations and to display results.

In another example of automated malware detection, a network appliance is used as a gateway device for perimeter defense of a corporate computer network. In typical configurations, the network appliance, which may be a physical machine or a virtual machine, may act as an interface between the corporate network and the Internet, so that a substantial fraction of data traffic between computers on the corporate network and the outside world is routed through the network appliance. An automated traffic analysis system may be installed on the network appliance, and configured to detect malware arriving at the appliance, for instance, as email attachments. Automated analysis may include opening and/or executing such attachments in a sandboxed environment and determining whether their behavior is indicative of malice.

Some advanced malicious agents are targeted towards specific companies, corporate networks or individuals. Such agents may be able to detect their environment, and only perform their malicious activity when executing within the targeted network or computer system. Other malware agents are designed to evade detection by conventional automated detection systems.

There is an increasing interest in developing computer security solutions which are capable of handling substantial amounts of samples, and are effective in detecting advanced forms of malware.

SUMMARY

According to one aspect, a computer system comprises a first hardware processor, a first memory, a memory shadower, and an interrupt generator. The memory shadower comprises a second memory and logic configured to take snapshots of the first memory, wherein each snapshot comprises a current content of a memory section of the first memory, and wherein taking snapshots comprises copying the current content from the first memory to the second memory. The computer system is configured to employ the first hardware processor to execute a batch of code samples loaded into the first memory, the batch selected from a corpus prior to loading the batch into the first memory. Selecting the batch comprises employing a malware filter to determine whether a candidate sample of the corpus is malicious, and in response, when the candidate sample is not malicious according to the malware filter, including the candidate sample into the batch. The computer system is further configured to employ the interrupt generator to inject a hardware interrupt into the first hardware processor, the hardware interrupt causing the security appliance to transition into a sleeping state, wherein the sleeping state is a state wherein the first processor is not executing instructions and the first memory is powered. The computer system is further configured, in response to transitioning into the sleeping state, to employ the memory shadower to take a snapshot of the first memory, and in response to taking the snapshot, to employ the memory shadower to transmit at least a part of the snapshot to a second hardware processor. The second hardware processor is configured to determine whether the snapshot is indicative of malicious activity resulting from executing the batch of code samples, and in response, when the snapshot is not indicative of malicious activity, to determine that no sample of the batch is malicious.

According to another aspect, a method comprises assembling a sample batch comprising a plurality of code samples selected from a corpus. Assembling the sample batch comprises employing a malware filter to determine whether a candidate sample of the corpus is malicious, and in response, when the candidate sample is not malicious according to the malware filter, including the candidate sample into the sample batch. The method further comprises, in response to assembling the sample batch, employing a first hardware processor to instruct a computer system to load the sample batch into a first memory of the computer system. The computer system further comprises a second processor configured to execute the sample batch, and further comprises a memory shadower and an interrupt generator. The memory shadower comprises a second memory and logic configured to take snapshots of the first memory, wherein each snapshot comprises a current content of a memory section of the first memory, and wherein taking snapshots comprises copying the current content from the first memory to the second memory. The method further comprises employing the first hardware processor to instruct the interrupt generator to inject a hardware interrupt into the second hardware processor, the hardware interrupt causing the computer system to transition into a sleeping state, wherein the sleeping state is a state wherein the second processor is not executing instructions and the first memory is powered. The method further comprises, in response to the computer system transitioning into the sleeping state, employing the first hardware processor to instruct the memory shadower to take a snapshot of the first memory. The method further comprises employing the first hardware processor to determine whether the snapshot is indicative of malicious activity resulting from executing the sample batch, and in response, when the snapshot is not indicative of malicious activity, employing the first hardware processor to determine that none of the plurality of code samples is malicious.

BRIEF DESCRIPTION OF THE DRAWINGS

The foregoing aspects and advantages of the present invention will become better understood upon reading the following detailed description and upon reference to the drawings where:

FIG. 2 shows an exemplary computer security appliance receiving data samples for analysis from a variety of clients, according to some embodiments of the present invention.

FIG. 3-A shows an exemplary use case scenario of the present invention, wherein a computer security appliance is used in conjunction with a sample aggregator.

FIG. 3-B shows another exemplary use case scenario of the present invention, wherein a computer security appliance is used to detect malware executing on a client computer system.

FIG. 3-C shows another exemplary use case scenario of the present invention, wherein a computer security appliance is used to detect malware received by a client system via an electronic message.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. Unless otherwise specified, computer security encompasses protecting users and equipment from unintended or unauthorized access to data and/or hardware, unintended or unauthorized modification of data and/or hardware, and destruction of data and/or hardware. Unless otherwise specified, a process is an instance of a computer program, such as an application or a part of an operating system, and is characterized by having at least an execution thread and a virtual memory space assigned to it, wherein a content of the respective virtual memory space includes executable code. Unless otherwise specified, a page represents the smallest unit of virtual memory that can be individually mapped to a physical memory of a computer system. The term "logic" encompasses hardware circuitry having a fixed or a reconfigurable functionality (e.g., field-programmable gate array circuits), but does not encompass software emulating such functionality on a general-purpose computer. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
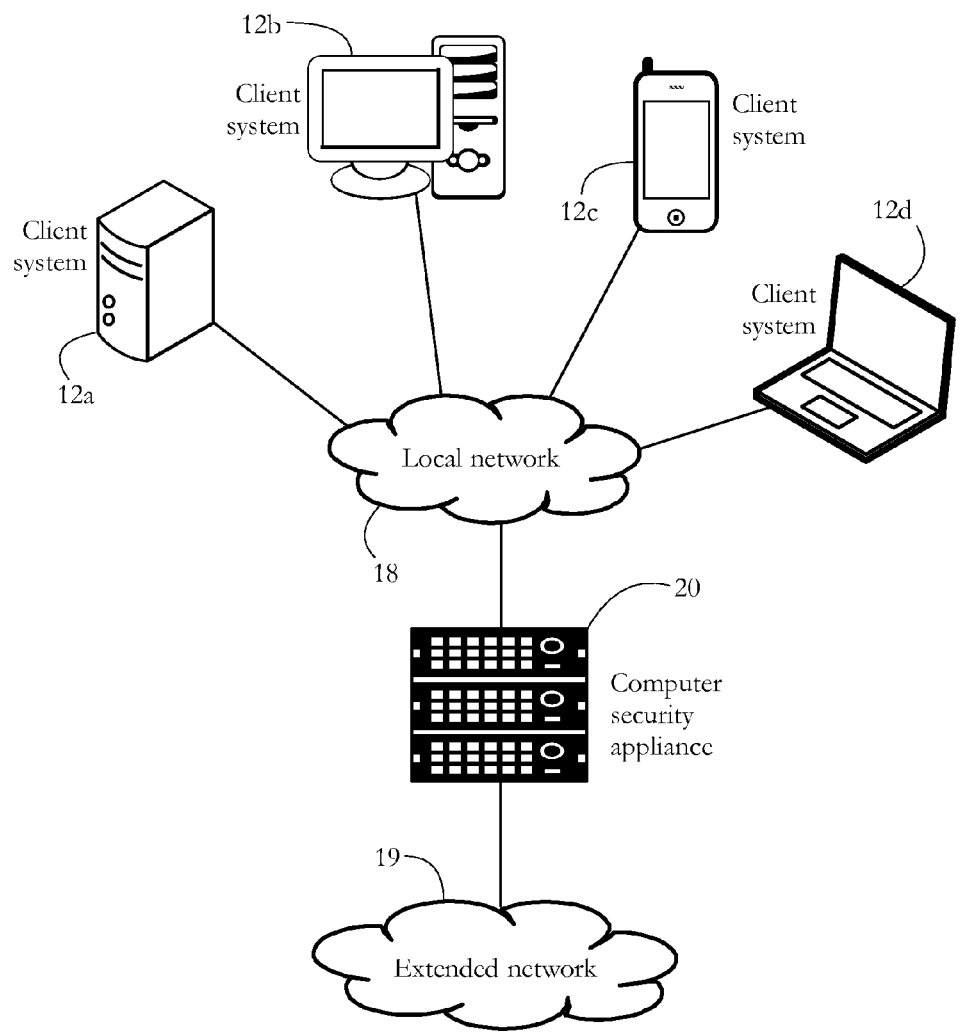
FIG. 1 shows an exemplary embodiment of the present invention, wherein an computer security appliance is used to protect a plurality of client systems from malware.

Some embodiments of the present invention describe using a physical computer security appliance to carry out automated computer security operations. FIG. 1 illustrates such an exemplary computer security appliance 20 configured to protect a plurality of client systems 12a-d from computer security threats. Clients 12a-d may include computer systems (such as corporate servers, personal computers, and laptops), portable computing devices (e.g., tablet computers, smartphones, wearable devices), and other electronic appliances (e.g., TVs, game consoles), among others. FIG. 1 shows computer security appliance positioned in a periphery-defense configuration, wherein client systems 12a-d are connected to a local network 18, such as a local area network (LAN) or corporate Intranet, and all access of client systems 12a-d to an extended network 19, such as the Internet, is routed through appliance 20. Such configurations may allow appliance 20 to block unauthorized or stealth communications between a client system and a computer system outside network 18.

FIG. 2 shows malware appliance 20 receiving data samples 30 for analysis from a variety of clients. Samples 30 may include, among others, electronic documents (such as Microsoft Office® or PDF documents), executable files, installer kits, and sections of executable code found in disk files or in a client system's memory (RAM). An exemplary data sample 30 includes an attachment to an electronic message sent to a client system.

One use-case scenario, illustrated in FIG. 3-A, corresponds to a malware analysis laboratory, wherein a sample aggregator 16 gathers a corpus of data samples using any method known in the art. Aggregator 16 may then send samples 30 to computer security appliance 20 for analysis, and in response, receive an analysis result 32 indicating, for instance, whether data sample 30 is malicious or not.

In another use-case scenario, illustrated in FIG. 3-B, a client system 12 sends data sample 30 to appliance 20 for analysis. In response, when sample 30 is malicious, appliance 20 may send a security alert to a system administrator. Such a configuration is commonly known as remote scanning or cloud scanning.

Yet another use-case scenario, illustrated in FIG. 3-C, corresponds to a mail filtering system, wherein a mail server 14 receives an electronic message 36 destined for client system 12. Before forwarding message 36 to client system 12, server 14 sends data sample 30 (for instance, a content of an attachment of message 36) to computer security appliance 20 for analysis. In response, when data sample 30 is malicious, mail server may block delivery of message 36 to client system 12. A similar configuration may be used to filter other kinds of electronic communication, such as network packets exchanged according to a Hypertext Transfer (HTTP) protocol. For instance, appliance 20 may be configured as a HTTP proxy, wherein web browser traffic between clients 12a-c and extended network 19 is routed through, and analyzed by, appliance 20. When a network packet comprises malware, or when a client attempts to download or send a malicious file, appliance 20 may block the delivery of the respective packet/file.

Figure 4:
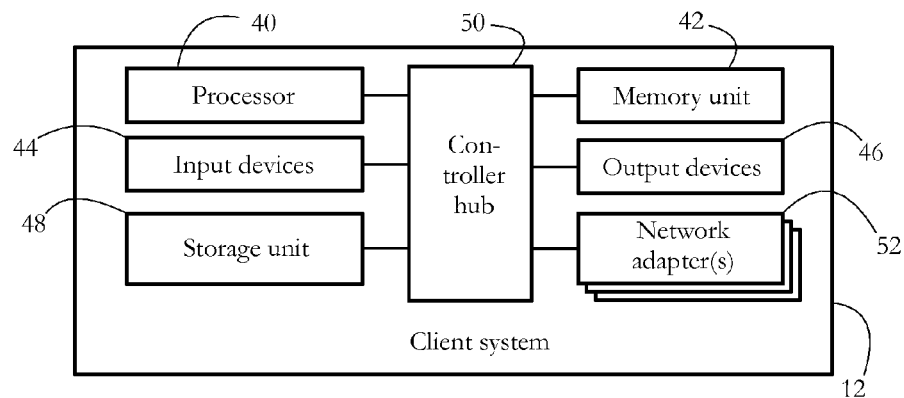
FIG. 4 illustrates an exemplary hardware configuration of a client system according to some embodiments of the present invention.

FIG. 4 shows an exemplary hardware configuration of client system 12 according to some embodiments of the present invention. FIG. 4 shows a computer system for illustrative purposes. Other kinds of devices, such as smartphones, may differ in configuration. Client system 12 includes a processor 40, a memory unit 42, a set of input devices 44, a set of output devices 46, a storage unit 48, and a set of network adapters 52, all interconnected by a controller hub 50. Processor 40 comprises a physical device (e.g. microprocessor, multi-core integrated circuit formed on a semiconductor substrate) configured to execute computational and/or logical operations with a set of signals and/or data. Memory unit 42 may comprise volatile computer-readable media (e.g. DRAM, SRAM) storing data/signals accessed or generated by processor 40 in the course of carrying out operations. Input devices 44 may include devices enabling a user to introduce data and/or instructions into client system 12, together with the respective hardware interfaces and/or adapters making such introduction possible. Exemplary input devices include, among others, a button, a keyboard, a mouse, a joystick, a touchscreen, a microphone, a camera, a game controller, a gesture detection system, and a motion detection sensor. Output devices 46 may include display devices such as monitors and speakers among others, as well as hardware interfaces/adapters such as graphic cards, allowing host system 12 to communicate data to a user. In some embodiments, input devices 44 and output devices 46 may share a common piece of hardware, as in the case of touch-screen devices. Storage unit 48 includes computer-readable media enabling the non-volatile storage, reading, and writing of software instructions and/or data. Exemplary storage units 48 include magnetic and optical disks and flash memory devices, as well as removable media such as CD and/or DVD disks and drives. Network adapter(s) 52 enable client system 12 to connect to a communication network, such as local network 18, and/or to other devices/computer systems.

In some embodiments, controller hub 50 includes the plurality of system, peripheral, and/or chipset buses, and/or all other circuitry enabling the communication between processor 40 and devices 42, 44, 46, 48, and 52. For example, hub 50 may include a northbridge and a southbridge. Exemplary components of controller hub 50 include a memory controller, an input/output (I/O) controller, and an interrupt controller. Depending on hardware manufacturer and device, some or all such controllers may be incorporated into a single integrated circuit, and/or may be integrated with processor 40. In some embodiments, some other devices, such as graphics adapters forming part of output devices 46, may be also integrated with processor 40.

Figure 5:
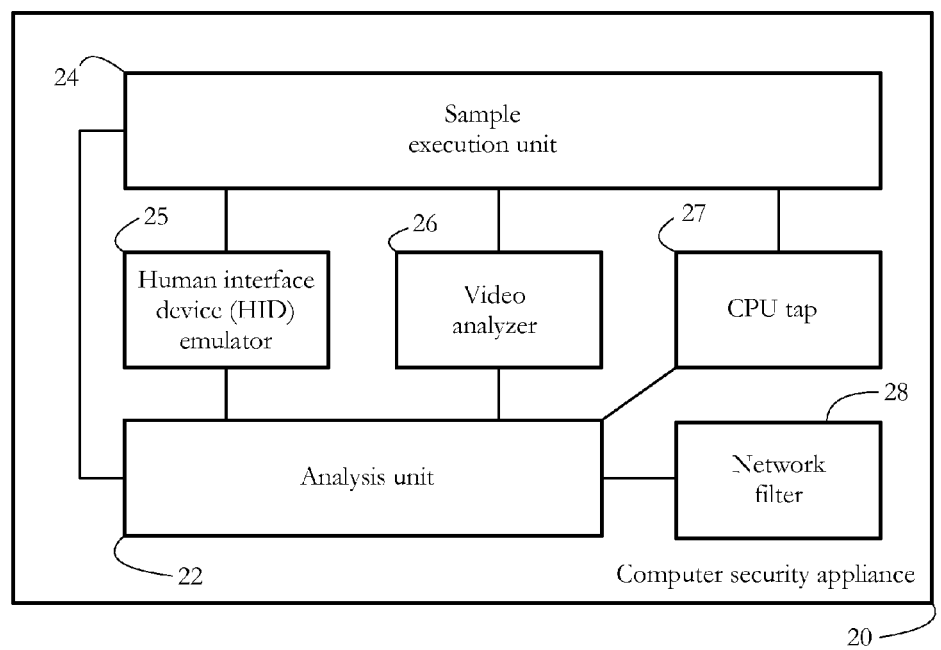
FIG. 5 shows an exemplary hardware configuration of a computer security appliance according to some embodiments of the present invention.

FIG. 5 shows exemplary hardware components of computer security appliance 20. In some embodiments, appliance 20 is a physical device (e.g., computer system) separate from client systems 12a-d and from other devices connected to network 18. Appliance 20 may be delivered, for instance, as a separate box to be connected to networks 18 and/or 19. In another example, appliance 20 may be delivered as a separate blade to be added to a corporate blade system/enclosure. Yet another example of appliance 20 comprises a printed circuit board configured to attach to a bus (e.g. a peripheral component interconnect express—PCIe bus) of a computer system. Hardware components of appliance 20 include a sample execution unit 24 and an analysis unit 22 connected to sample execution unit 24.

In some embodiments, sample execution unit 24 comprises an electronic device configured to closely mimic a client system such as a personal computer or smartphone. Sample execution unit 24 may be further configured to employ a dedicated processor to process data sample 30. When data sample 30 includes a file, exemplary sample processing by execution unit 24 include performing a set of operations with the respective file, such as opening the respective file, loading a part of the respective file into a memory of sample execution unit 24, and manipulating data of the respective file, among others. When sample 30 includes executable code, processing sample 30 comprises executing at least a part of the respective code on the processor of sample execution unit 24.

In some embodiments, analysis unit 22 may employ a processor distinct from the processor of unit 24 to coordinate processing of sample 30. For example, analysis unit 22 may instruct execution unit 24 to perform certain actions, and may receive data from execution unit 24. Analysis unit 22 may be further configured to determine whether data sample 30 poses a computer security threat (e.g. contains malware), according to data received from sample execution unit 24.

The connection between units 22 and 24 may use multiple interfaces, such as universal serial bus (USB), Ethernet, or Firewire® to send and/or receive data to/from a storage shadower of execution unit 24, and a peripheral component interconnect express (PCIe) connection to send/receive memory data to/from a memory shadower of execution unit 24, as shown in more detail below.

In some embodiments, computer security appliance 20 (FIG. 5) may further comprise a human interface device (HID) emulator 25, a video analyzer 26, a CPU tap 27 and a network filter 28, all connected to analysis unit 22. HID emulator 25 may comprise a physical device (e.g., integrated circuitry) configured to mimic a pattern of behavior of a human user, e.g., to generate signals and/or data that, when transmitted to an input interface of a computer system, cause the computer system to behave as if a human operator were inputting the respective signals/data using an input device, such as a keyboard or a mouse. Some embodiments use HID emulator 25 at various times during processing of data sample 30 to create the impression that a human operator is controlling or otherwise interacting with sample execution unit 24. In some embodiments, the pattern of behavior is generated by analysis unit 22, in which case HID emulator 25 only acts as a mouse/keyboard emulator, receiving control signals from analysis unit 22 instead of actual keypresses, mouse clicks etc.

In some embodiments, video analyzer 26 may comprise a physical device configured to receive an output of an output interface (e.g., display adapter) of a computer system, and to interpret the output to determine, for instance, whether the output may cause a video display connected to the respective output interface to display an object (such as a GUI element, a window, a popup). Video analyzer 26 may be further configured to determine an on-screen behavior of the respective object, such as a movement, a change of size, a change of color, etc.

In some embodiments, CPU tap 27 may include a physical device (e.g., integrated circuit) configured to control the operation of the processor of sample execution unit 24, for instance to suspend and restart execution of the respective processor, as instructed by analysis unit 22. Such a suspension and/or restart may be performed at various stages during the processing of data sample 30, for instance in order to read and/or modify a content of a register of the respective processor. Several methods are known in the art for suspending execution of a processor, and CPU tap 27 may implement any such method. For instance, an exemplary CPU tap may include a debugger device configured according to the Joint Test Action Group (JTAG) standard.

In some embodiments, network filter 28 comprises a physical device (e.g., integrated circuit) configured to selectively allow or deny transmission of data and/or signals between client systems 12*a-d* and another computer system connected to extended network 19. Exemplary network filters 28 include network appliances such as gateways, firewalls, routers, etc. In some embodiments, network filter 28 duplicates received data packets, forwarding a copy to analysis unit 22.

Figure 6:
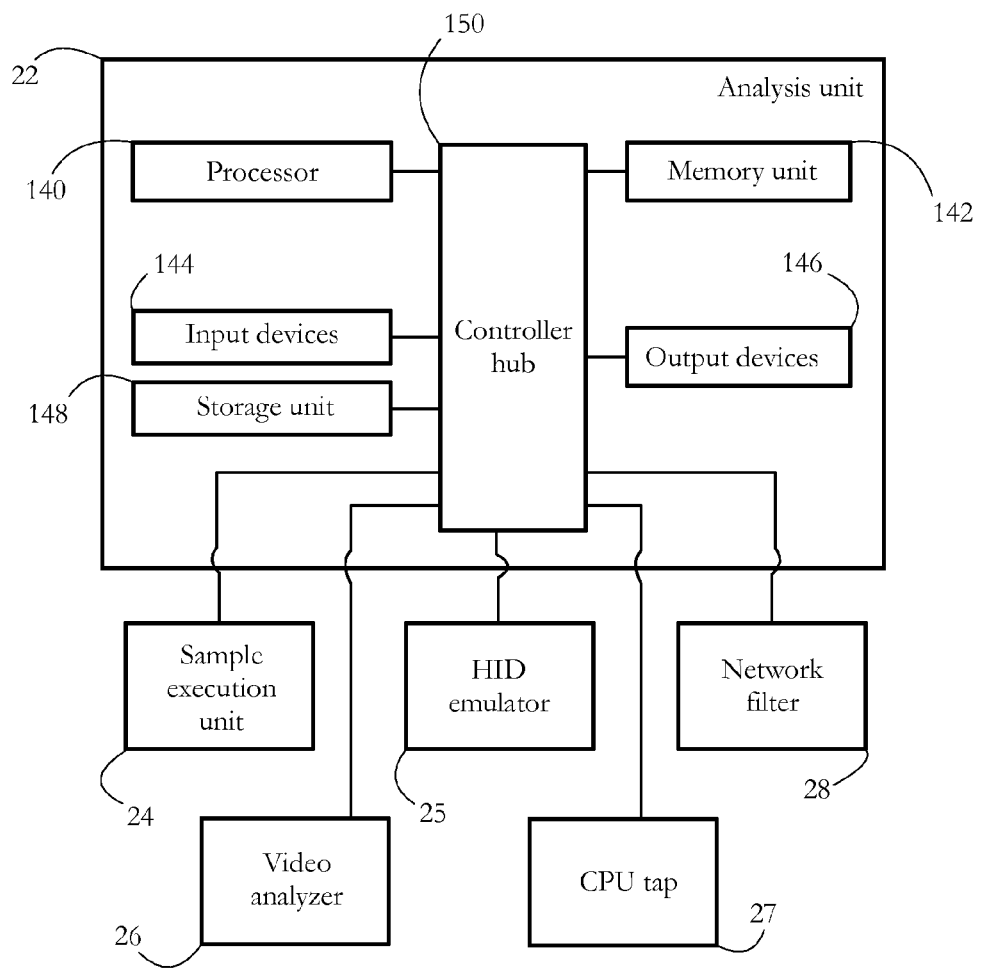
FIG. 6 shows an exemplary hardware configuration of the analysis unit of the computer security appliance of FIG. 5, according to some embodiments of the present invention.

FIG. 6 illustrates an exemplary hardware configuration of analysis unit 22 according to some embodiments of the present invention. In one example, analysis unit 22 comprises a conventional personal computer. Analysis unit 22 includes a processor 140 and a memory unit 142 (e.g., DRAM), interconnected via a controller hub 150. In some embodiments, analysis unit 22 may further include input devices 144, output devices 146, and a storage unit 148 (e.g., hard disk or solid state drive). Controller hub 150 may comprise a plurality of interfaces/connectors, each such interface allowing analysis unit to connect to sample execution unit 24, HID emulator 25, video analyzer 26, CPU tap 27, and network filter 28. Such connections may be used to transmit data, instructions and/or control signals from analysis unit 22 to components 25, 27, and 28 and/or to receive data from video analyzer 26, at various times during processing of data sample 30 by sample execution unit 24.

Figure 7:
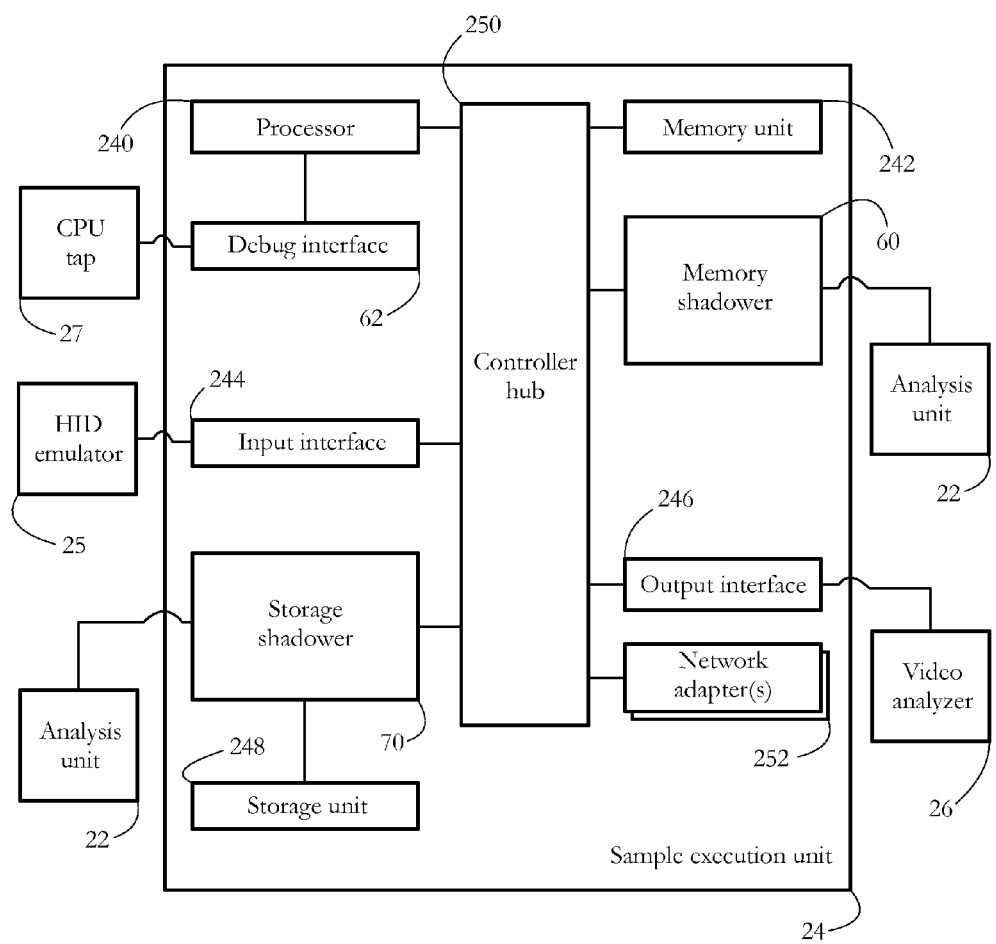
FIG. 7 illustrates an exemplary hardware configuration of the sample execution unit of the computer security appliance of FIG. 5, according to some embodiments of the present invention.

FIG. 7 shows an exemplary hardware configuration of sample execution unit 24 according to some embodiments of the present invention. In some embodiments, execution unit 24 comprises a personal computer distinct from analysis unit 22, the PC configured to closely resemble a client system such as client systems 12*a-d* in FIG. 1. Sample execution unit 24 comprises a processor 240 and a memory unit 242 (e.g., DRAM) distinct from processor 140 and memory unit 142 of analysis unit 22, respectively. Sample execution unit 24 may further comprise a memory shadower 60 and a storage shadower 70. Such components are interconnected with processor 240 and memory unit 242 via a controller hub 250. The illustrated sample execution unit further comprises a storage unit 248 (e.g., hard disk or solid state drive) connected to storage shadower 70 and distinct from storage unit 148 of analysis unit 22. Storage unit 248 may store data usable to launch an operating system and/or a set of software applications within sample execution unit 24. In some embodiments, sample execution unit 24 further comprises an input interface 244, an output interface 246, and a set of network adapters 252, all connected to hub 250, and a debug interface 62 connected to processor 240.

In some embodiments, input interface 244 is connected to and receives input signals/data from HID emulator 25 controlled by analysis unit 22, such signals simulating the actions of a human operator controlling or otherwise interacting with sample execution unit 24. Input interface 244 may include, for instance, a keyboard and/or a mouse adapter (e.g., one or more USB ports). Output interface 246 is connected to and transmits data to video analyzer 26. Output interface 246 may comprise, for instance, a display adapter and/or graphics card. In some embodiments, debug interface 62 is connected to and receives signals from CPU tap 27, the respective signals configured to halt and/or restart processor 240 as instructed by analysis unit 22. An exemplary debug interface 62 includes a JTAG connector.

Figure 8:
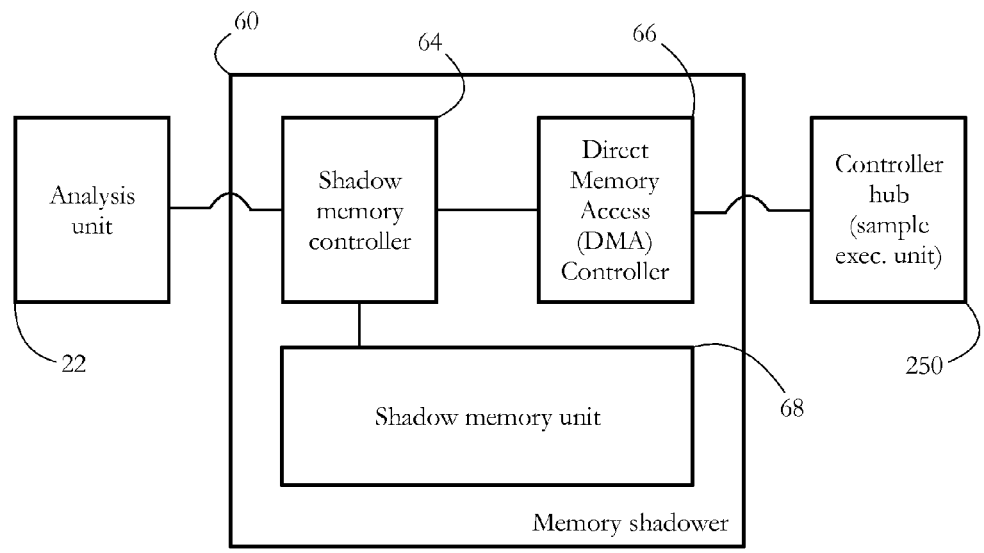
FIG. 8 illustrates exemplary components of a memory shadower according to some embodiments of the present invention.

In some embodiments, memory shadower 60 comprises a physical device (e.g., an integrated circuit) configured to access memory unit 242 of sample execution unit 24 in order to read data from unit 242 and/or to write data to memory unit 242. Such read/write operations may be performed at the request of analysis unit 22. FIG. 8 shows an exemplary configuration of memory shadower 60, including a shadow memory controller 64 connected to analysis unit 22, a direct memory access (DMA) controller 66 connected to shadow memory controller 64, and a shadow memory unit 68 connected to shadow memory controller 64. In some embodiments, DMA controller 66 enables memory shadower 60 to access memory unit 242 to read and/or write data independently of processor 240. DMA controller 66 may be connected to memory unit 242 via controller hub 250, e.g., by means of a PCI express adapter.

Shadow memory unit 68 may comprise volatile computer-readable media (e.g. DRAM in the form of a memory bank). In some embodiments, shadow memory unit 68 is configured with a storage capacity greater than, and at least equal to the capacity of memory unit 242. Memory shadower 60 may be configured to download a snapshot (i.e., a copy) of the contents of memory unit 242, and to acquire a differential memory snapshot from memory unit 242. In some embodiments, a differential memory snapshot comprises a data structure indicating a location of a section of memory (e.g., a memory page) of memory unit 242 where a current content of the respective section of memory differs from a reference content. An exemplary reference content may comprise the content of the respective section of determined at a previous time. The differential memory snapshot may also include a current content of the respective section of memory. In other words, a differential memory snapshot may indicate where the contents of memory unit 242 have changed from a previously-determined reference value, and what is the current content of the changes memory sections.

Figure 9:
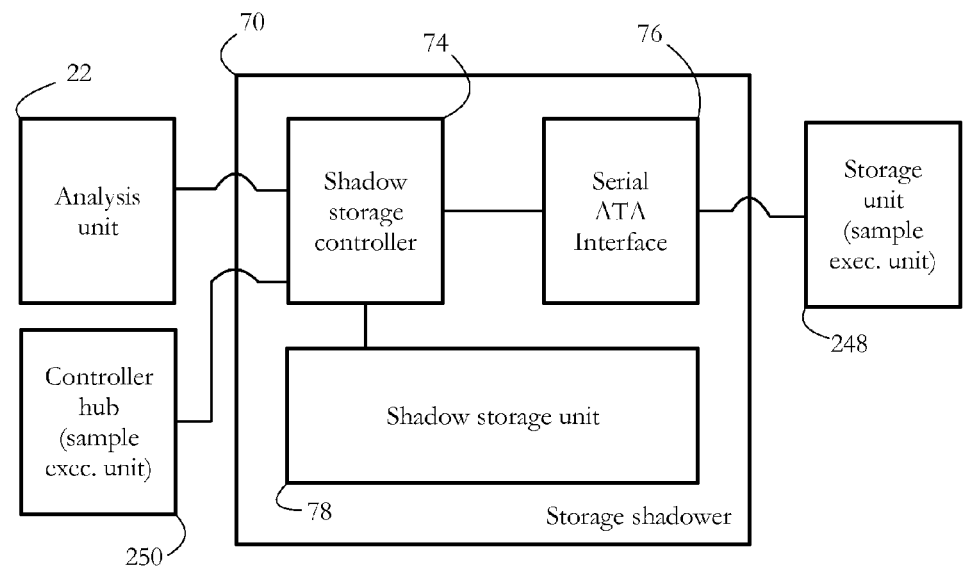
FIG. 9 illustrates exemplary components of a storage shadower according to some embodiments of the present invention.

In some embodiments, storage shadower 70 comprises a physical device (e.g., an integrated circuit) configured to mimic storage unit 248 of sample execution unit 24. Storage shadower 70 may read data, such as a content of a disk sector page, from unit 248 and/or write data to storage unit 248. Such read/write operations may be performed at the request of analysis unit 22. FIG. 9 shows an exemplary configuration of storage shadower 70, including a shadow storage controller 74 connected to analysis unit 22, a serial ATA controller 76 connected to shadow storage controller 74, and a shadow storage unit 78 connected to shadow storage controller 74. In some embodiments, SATA controller 76 is used to connect to storage unit 248 (e.g., the physical hard disk) of sample execution unit 24. Shadow storage controller 74 further connects to controller hub 250. The choice of a SATA controller is not meant to be limiting. Some embodiments may be configured to use other controllers, e.g. SAS, SATA express, etc.

Shadow storage unit 78 may comprise non-volatile computer-readable media (e.g. a hard disk or a solid state drive), or volatile computer-readable media (e.g., a RAM-based storage device), and may be configured with a storage capacity greater than, or at least equal to the capacity of storage unit 248. In some embodiments, a lower capacity drive may be used in conjunction with a data compression protocol.

In some embodiments, storage shadower 70 is configured to operate as a copy-on-write (CoW) device. In one such example, shadower 70 may intercept an attempt by a software object executing within sample analysis unit 24 to write a set of data to storage unit 248, and may redirect the write attempt to shadow storage unit 78. In other words, storage shadower 70 may ensure that the contents of storage unit 248 is not modified by software executing within sample execution unit 24. To achieve such functionality, storage shadower 70 may be connected as shown in FIG. 7, i.e., so that storage unit 248 is connected to controller hub 250 via storage shadower 70.

In some embodiments, storage shadower 70 may be configured to acquire a differential storage snapshot from storage unit 248. In some embodiments, a differential storage snapshot comprises a data structure indicating which locations of a storage section (e.g., a disk sector) of storage unit 248 have their contents modified as a consequence of software executing within sample execution unit 24. The differential storage snapshot may further comprise a current content of the respective storage sections. In an example where shadower 70 operates in a copy-on-write configuration as described above, acquiring a differential storage snapshot may comprise comparing a content of storage unit 248 to a corresponding content of shadow storage unit 78, for instance, sector-wise.

In some embodiments, storage shadower 70 is further configured to attach a time stamp to each write event. Each time shadower 70 detects an attempt to modify the contents of storage unit 248 of sample execution unit 24, it may record the current time. In this manner, storage shadow unit 78 may store a timeline of modifications.

Figure 10:
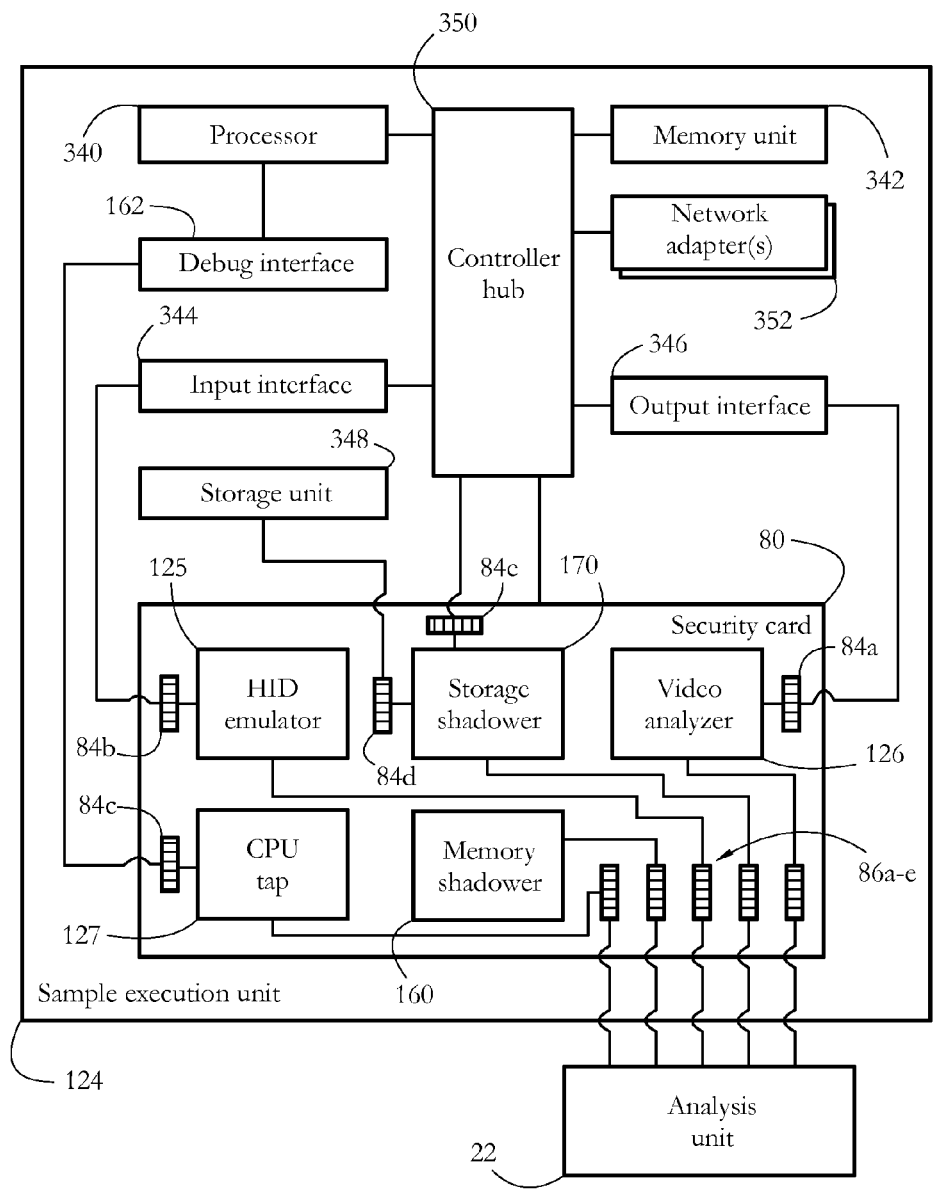
FIG. 10 shows an alternative exemplary configuration of a sample execution unit, wherein a human interface device (HID) emulator, a CPU tap, and a video analyzer are grouped together with a memory shadower and a storage shadower on a printed circuit board.

FIG. 10 shows a sample execution unit 124 (an alternative embodiment of unit 24), wherein a HID emulator 125, a video analyzer 126 and a CPU tap 127 are combined with a memory shadower 160 and a storage shadower 170 within a common piece of hardware such as a security card 80. Card 80 may be presented as a PCI express card, and may connect to a controller hub 350 via a PCI express connector/slot. Security card 80 may include a set of connectors 84*a-e* enabling various components integrated in card 80 to connect to other components of sample execution unit 124 using standard, off-the-shelf cables and connectors. For instance, connectors 84*d-e* may be SATA connectors able to receive a SATA ribbon cable. In some embodiments, memory shadower 160 may connect to hub 350 through the PCI express connector of card 80. Card 80 may further expose a set of ports 86*a-e*, for instance USB ports enabling components of card 80 to connect to analysis unit 22 to send and/or receive data.

Figure 11:
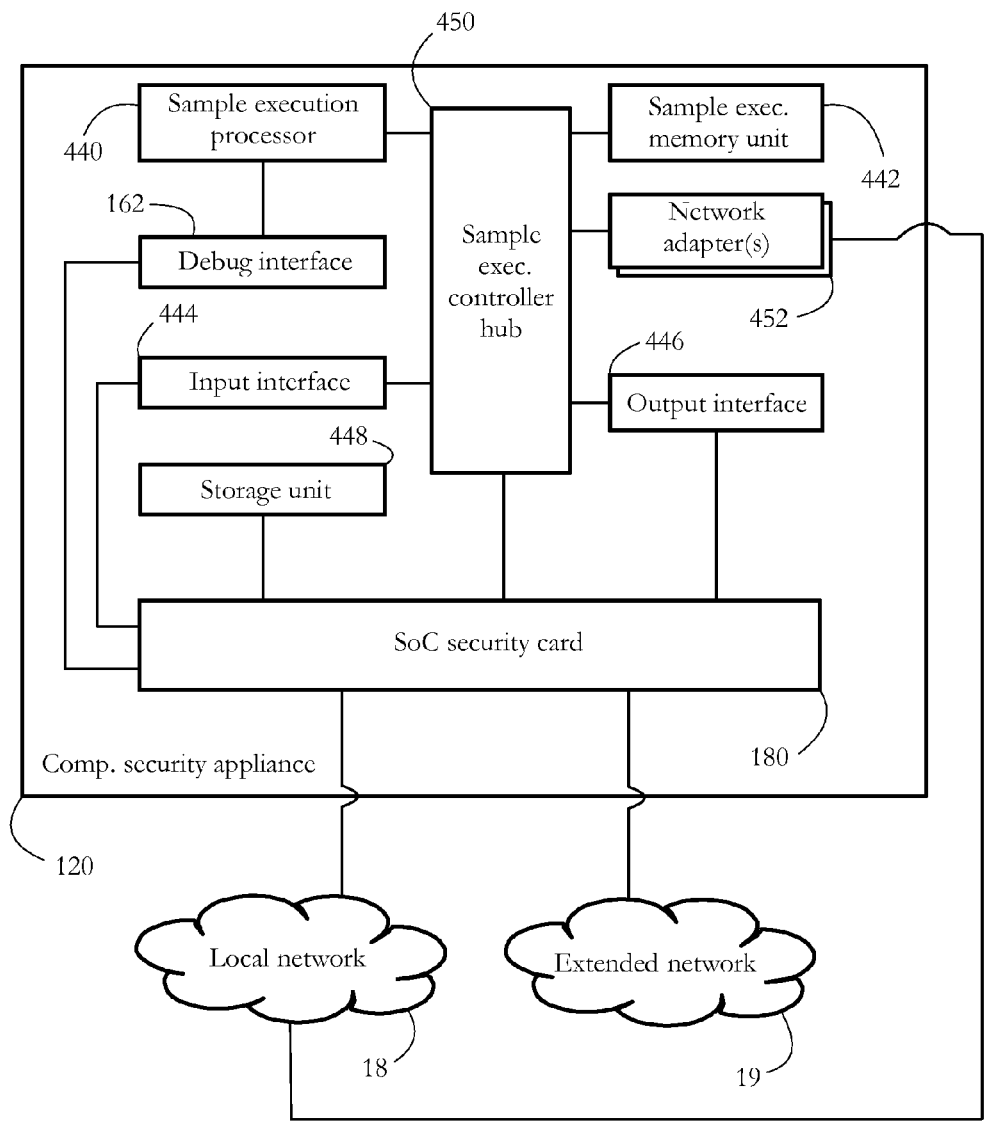
FIG. 11 shows an alternative exemplary configuration of the computer security appliance, including a security system-on-a-chip (SoC) card integrating an analysis unit with components of a sample execution unit, according to some embodiments of the present invention.
Figure 12:
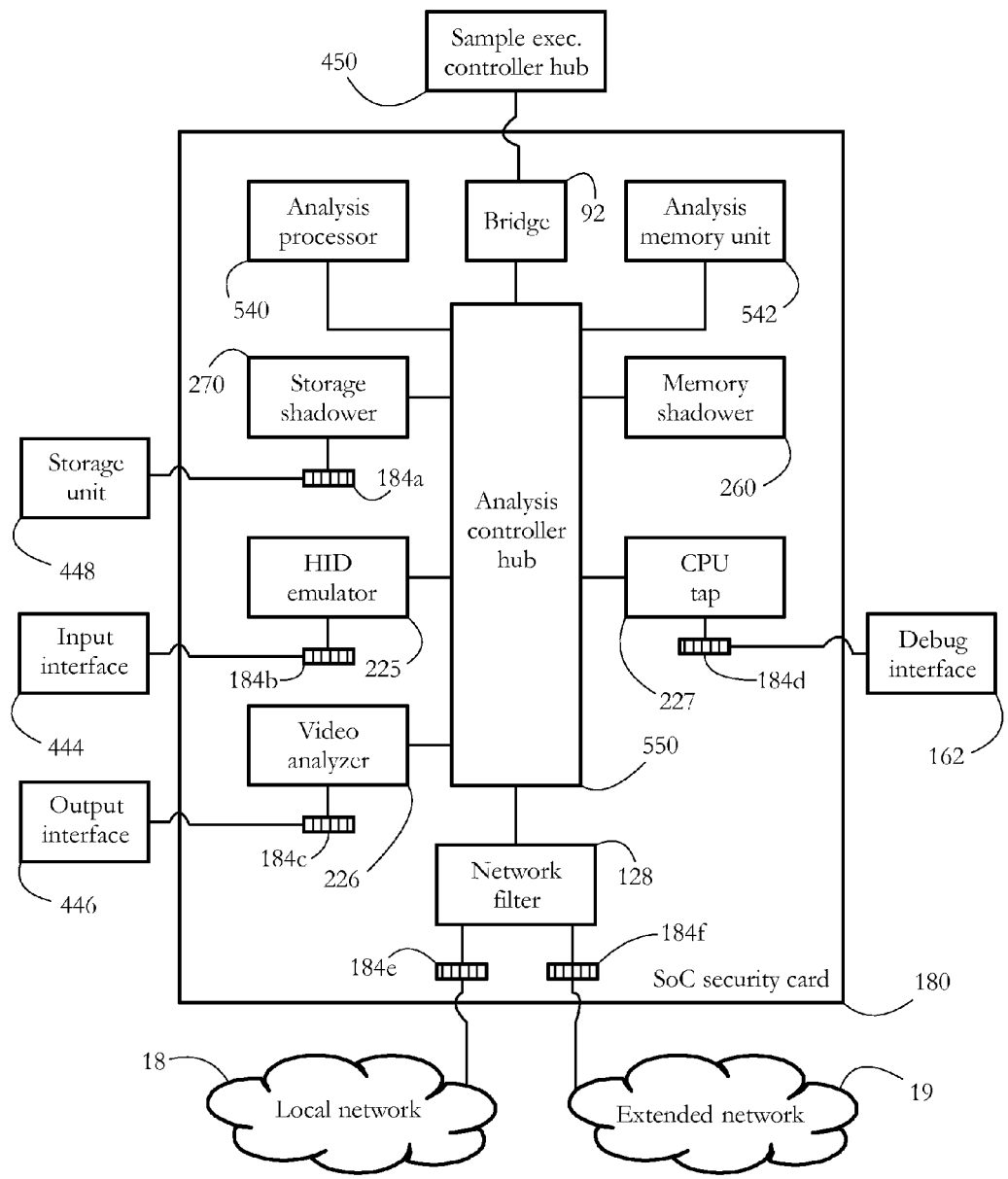
FIG. 12 illustrates an exemplary hardware configuration of the security SoC card of FIG. 11 according to some embodiments of the present invention.

FIGS. 11-12 show yet another embodiment of a computer security appliance (appliance 120), wherein some components of analysis unit 22 are integrated with some components of sample execution unit 24 on a common piece of hardware, e.g., a system-on-a-card (SoC) security card 180. Exemplary appliance 120 may be a personal computer system or a server blade, receiving SoC security card 180, for instance, into a PCI express connector/slot. Appliance 120 includes a sample execution processor 440 usable to process data sample 30, and a sample execution memory unit 442 comprising volatile computer-readable media (e.g.

DRAM) storing data/signals accessed or generated by processor 440 in the course of processing sample 30. Appliance 120 may further comprise a debug interface 162 (e.g. JTAG connector) connected to processor 440, an input interface 444, an output interface 446, and a set of network adapters 452. Components 444-446-452 are interconnected via a sample execution controller hub 450 (e.g., chipset and/or buses). Appliance 120 further includes a storage unit 448 connected to SoC security card 180, and storing data files usable to launch an operating system and a set of software applications to be executed by processor 440.

In some embodiments, SoC security card 180 comprises an analysis processor 540 and an analysis memory unit 542, distinct from processor 440 and memory unit 442, respectively. Processor 540 may be configured to coordinate transmission of data/control signals between card 180 and other components of appliance 120, and/or to determine whether sample 30 contains malware according to such data. Processor 540 may be further configured to execute an operating system such as Linux®.

Card 180 may further comprise a memory shadower 260, a storage shadower 270, a HID emulator 225, a video analyzer 226, a CPU tap 227, and a network filter 128, all interconnected via an analysis controller hub 550. Hub 550 may connect to controller hub 450 of computer security appliance 120 (FIG. 11) by means of a bridge 92. A set of connectors 184*a*-*f* enable components of card 180 to connect to other components of appliance 120 using standard, off-the-shelf cables and connectors. For example, connectors 184*e*-*f* may be Ethernet connectors.

In one exemplary embodiment, card 180 is implemented using an ARM® architecture, wherein processor 540 is an ARM integrated circuit, and wherein controller hub 550 is compatible with an advanced microcontroller bus architecture (AMBA). In such embodiments, bridge 92 may include a PCI Express—to—AMBA bridge, enabling, for example, memory shadower 260 to use DMA to read and/or write data from/to sample execution memory unit 442.

Figure 13:
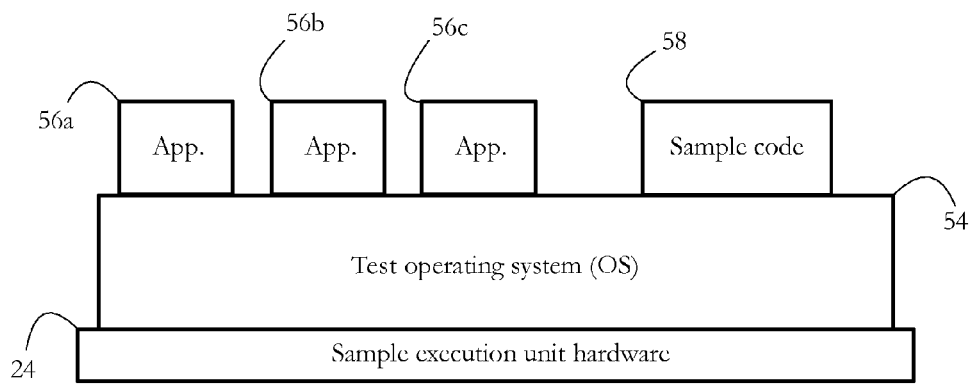
FIG. 13 shows exemplary software components executing on a sample execution unit according to some embodiments of the present invention.

FIG. 13 shows an exemplary set of software objects executing on sample execution unit 24 (FIG. 5), according to some embodiments of the present invention. Unit 24 may be configured to run a test operating system (OS) 54, which may be a version of a popular OS such as Windows®, Linux® or Android®. Unit 24 may further execute a set of applications 56*a-c*, generically representing any software program usually targeted by malware. Exemplary applications 56*a-c* include Microsoft Office®, Adobe Acrobat®, Adobe Flash® player, web browser, instant messaging, and email applications, among others. Test OS 54 and/or applications 56*a-c* may be launched from files stored on storage unit 248 of sample execution unit 24 (FIG. 7).

In some embodiments, sample execution unit 24 further executes a sample code 58 including a part of data sample 30 received by computer security appliance 20 for analysis. Sample code 58 includes a sequence of processor instructions, which in some cases may be embedded into a document (e.g., a Word® macro, or a PDF exploit). In some embodiments, sample code 58 may be packed within data sample 30 in an encrypted form. In such situations, unit 24 may unpack/decrypt sample code 58 before executing it.

Figure 14:
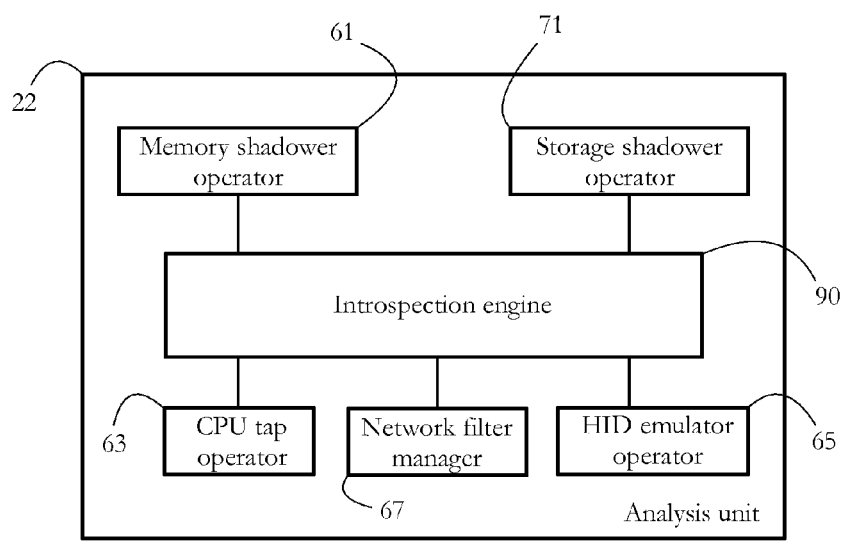
FIG. 14 shows exemplary software components executing on an analysis unit according to some embodiments of the present invention.

FIG. 14 shows exemplary software components executing on analysis unit 22 according to some embodiments of the present invention. Such components include an introspection engine 90 and a set of operators 61, 63, 65, 67, and 71, each such operator configured to interface with the respective hardware component of computer security appliance 20. For instance, HID emulator operator 65 may include a software module, e.g., a driver, configured to send control signals/instructions to HID emulator 25. In some embodiments, analysis unit 22 further executes an operating system, e.g., a modified version of a popular OS such as Linux®, the respective OS providing an interface between software and hardware components of analysis unit 22.

In some embodiments, introspection engine 90 is configured to analyze a content of memory unit 242 of sample execution unit 24, to determine, for instance, a location/address of various software modules, such as components of test OS 54, internal kernel data structures (e.g., EPROCESS, ETHREAD on Windows® platforms), various libraries, as well as executable modules of applications 56*a-c* and/or sample code 58. Introspection engine 90 is further configured to coordinate processing of data sample 30 and the operation of various hardware components of anti-malware unit 24 (e.g. HID emulator 25, CPU tap 27, etc.).

Figure 15:
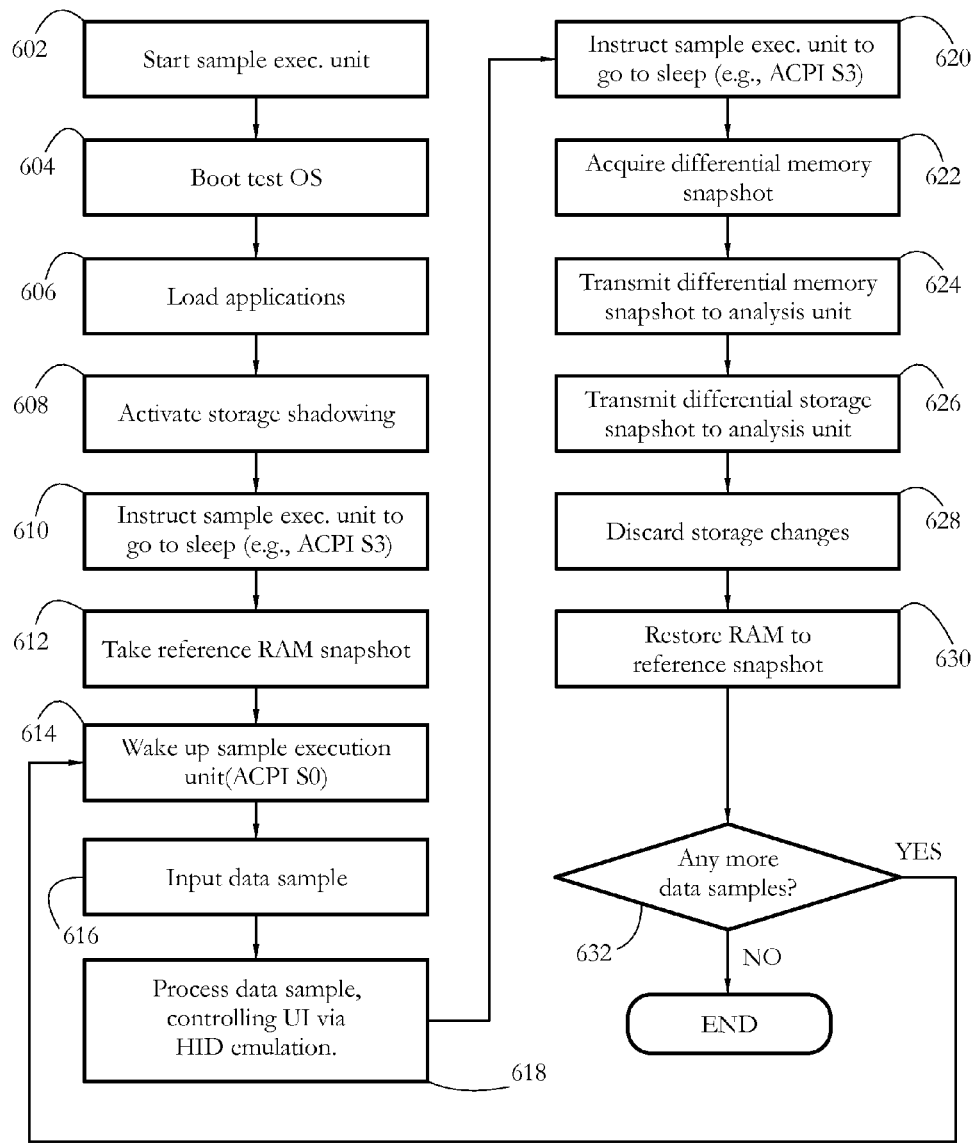
FIG. 15 shows an exemplary sequence of steps performed by the sample execution unit according to some embodiments of the present invention.

FIG. 15 shows an exemplary sequence of steps performed by sample execution unit 24 according to some embodiments of the present invention. Steps 602-604-606 set up a host software environment for data sample 30 by booting test OS 54 and loading applications 56*a-c*. Executing these steps provides a baseline state of execution unit 24, before processing any data of sample 30. The baseline state provides a realistic state of a user's computer system, that a malware agent may find upon arrival. In some embodiments, after processing each data sample 30, unit 24 is reverted to the baseline state, as shown below.

A step 608 activates storage shadower 70. In some embodiments, storage shadowing includes redirecting an attempt to write to the disk, from storage unit 248 (FIG. 7) to shadow storage unit 78 (FIG. 9) instead. Thus, shadow storage unit 78 will record all changes that processing data sample 30 would make to the contents of local storage, while the contents of storage unit 248 remain intact.

In preparation for recording the baseline state, a step 610 may transition sample execution unit 24 to a sleeping state of power management, to preserve the current state of unit 24. In some embodiments, the sleeping state comprises a state wherein the processor of sample execution unit 24 is suspended (i.e., not executing instructions), and wherein the memory of unit 24 remains powered. Several such sleeping states are known in the art, for instance sleeping states compliant with the Advanced Configuration and Power Interface (ACPI) standard. One exemplary sleeping state is ACPI state S3, also known as suspend-to-RAM. In some embodiments, transitioning to an S3 state comprises saving the processor state (e.g., register values) to RAM before powering down the processor.

To transition sample execution unit 24 into the sleeping state (step 610), some embodiments may employ a function of test OS 54 (FIG. 13), the function configured to perform power management operations. In one exemplary embodiment, analysis unit 22 may trigger the execution of such an OS function by instructing HID emulator 25 to send a signal to processor 140 of analysis unit 24, the signal configured to mimic another signal generated when a user interacts with an input device to indicate an intent to put the respective computer system to sleep. For instance, the signal sent to processor 140 may be similar to the one generated when a user presses an on/off button or some other key combination on a keyboard, when a user closes a lid of a laptop, or when the user employs a mouse to click a graphical user interface (GUI) element to request that the respective system is put to sleep.

In an alternative embodiment, sample execution unit 24 may be transitioned into the sleeping state by using a modified interrupt handler. Sending signals from HID 25 to processor 140 may comprise HID 25 injecting a hardware interrupt into processor 140, for instance via input interface 244 (FIG. 7). Such interrupts are typically handled by dedicated functions of the OS, known as interrupt handlers. Some embodiments modify the functionality of the respective handler, for instance by hooking, code injection, patching of a page table entry, or any other method known in the art of computer security, so that when the respective hardware interrupt occurs, execution is redirected to a piece of code performing the transition to the sleeping state. In some embodiments, modifying the handler, and/or supplying an alternative piece of code executing instead of the handler, may comprise employing memory shadower 60 and/or storage shadower 70 to inject code into a memory of sample execution unit 24 (see details below).

In a step 612 (FIG. 15), memory shadower 60 takes a reference snapshot of the memory of unit 24, to be used as the baseline state, after which, a step 614 switches unit 24 back on (e.g. to ACPI state S0). Some embodiments further compress the reference RAM snapshot, to save computing resources.

A sequence of steps 616-632 are executed in a loop, for each data sample 30 received for analysis. In some embodiments, each data sample is processed in a manner intended to mimic processing by a human operator. Processing of data sample 30 may include launching sample 30 into execution, and opening data sample using one of applications 56*a*-*c*. In one example, wherein data sample 30 includes a PDF file, processing of sample 30 may include saving the file to storage unit 248 (e.g., the local hard disk), and opening the file with Adobe Acrobat Reader®. Opening the respective file may trigger execution of a sequence of code embedded in the respective document (such as a malware exploit). To mimic the manner in which a human operator would handle the respective file, some embodiments employ HID emulator 25 to manipulate the file, for instance by inputting a signal to an input interface of unit 24, the signal consistent with a user moving a mouse cursor on a screen, to select and click an icon of the respective file.

Some embodiments may employ HID emulator 25 to launch software, such as anti-malware components (scanning engines, drivers, etc.), within sample execution unit 24, during processing of sample data. For instance, analysis unit 22 may manipulate a mouse and/or keyboard interface of unit 24 via HID emulator 25 to expose a command-line prompt and to type a command at the respective prompt. The command may be configured to launch the respective software components. Such software launched, for instance, at random moments during processing of a data sample, may surprise a malware agent in the process of performing some malware-indicative operations. Some embodiments may bring the respective software/anti-malware components from outside sample execution unit 24, e.g., from a location on local network 18, on demand, via the typed-in command.

In some embodiments, each data sample 30 is allowed to execute for a predetermined amount of time (e.g., a few minutes), after which sample execution unit 24 is again suspended to RAM, and memory shadower 60 takes a new memory snapshot. The current contents of RAM may be compared to the reference RAM snapshot, to determine changes that occurred to the contents of memory of unit 24 during processing of data sample 30. In some embodiments, storage shadower 70 computes a differential storage snapshot according to the contents of shadow storage unit 78. A sequence of steps 624-626 transmit the differential memory and storage snapshots for analysis to analysis engine 22. The respective snapshots may be compressed.

Steps 628-630 restore sample analysis unit 24 to the baseline state by discarding contents of shadow storage unit 78 (thus erasing changes made to storage contents), and re-loading the reference RAM snapshot into memory. Steps 614-630 may then be re-executed for another data sample, until all data samples have been analyzed.

Figure 16:
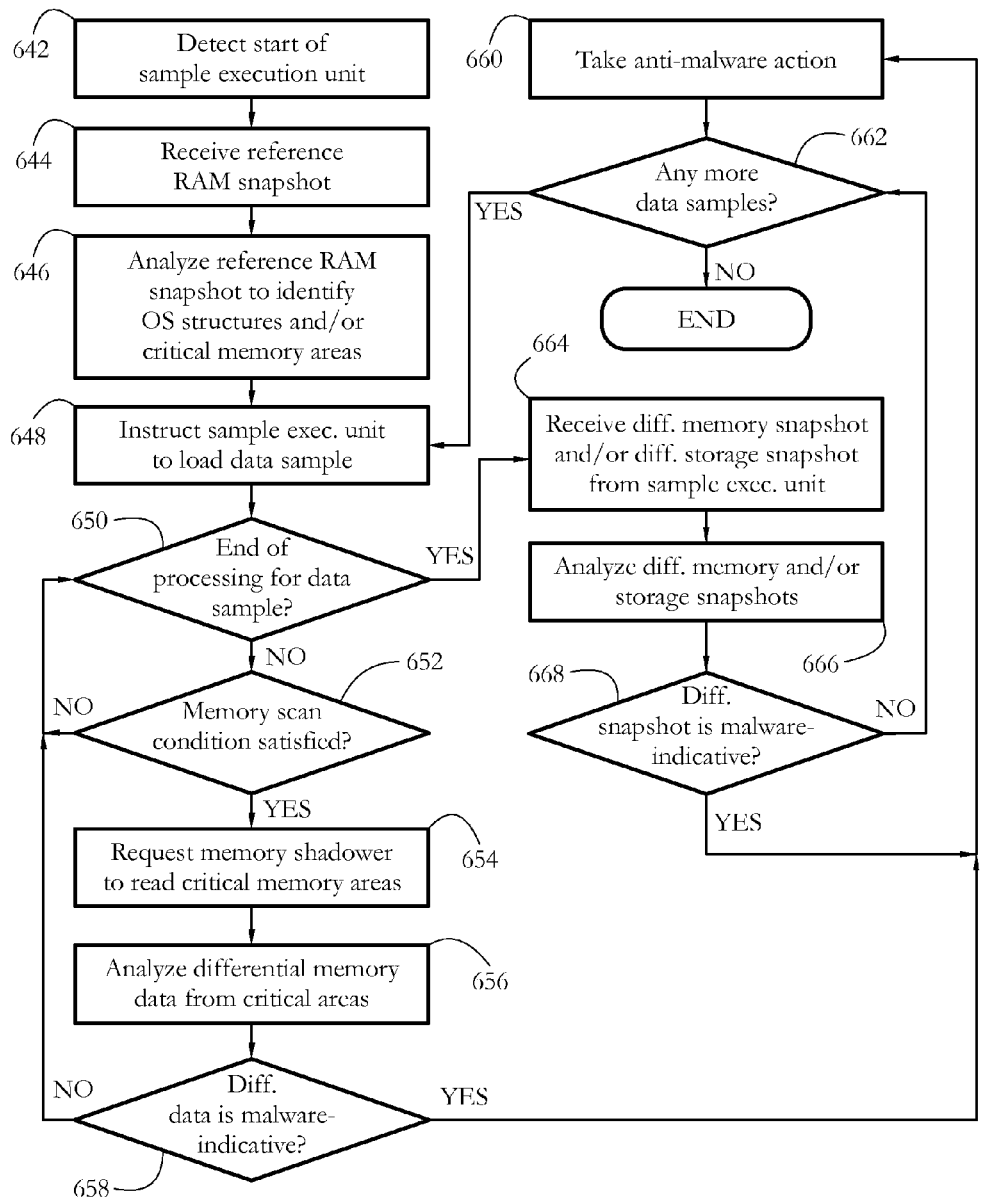
FIG. 16 illustrates an exemplary sequence of steps performed by the analysis unit according to some embodiments of the present invention.

FIG. 16 shows an exemplary sequence of steps performed by components of analysis unit 22 according to some embodiments of the present invention. In steps 642-644-646, analysis unit 22 may employ introspection engine 90 to analyze the reference RAM snapshot taken by memory shadower 60 in step 612 (FIG. 15), to reveal semantics of memory use. For instance, introspection engine 90 may determine the memory locations/addresses of various software components such as OS modules, internal kernel data structures, page tables, interrupt handlers, drivers, and libraries loaded by applications 56*a*-*c*, as well as determine a set of inter-relations between such components. Introspection engine 90 may further determine the locations of several critical memory areas, for instance areas storing software objects frequently attacked by malware (e.g. system call table). Such semantic reconstruction may facilitate malware analysis, by facilitating the interpretation of differential memory snapshots, i.e., of changes made to the content stored at various addresses during processing of data sample 30.

In some embodiments, analysis unit 22 may instruct sample execution unit 24 to load/process each data sample 30 (step 648), and at the end of processing by unit 24, receive from unit 24 the differential memory and/or storage snapshots (step 664). Analysis unit 22 may further interpret the changes that occurred to the contents of memory and/or storage during processing of data sample 30 and determine whether the respective changes are malware-indicative (step 666). In one example, analysis step 666 may reveal that the content of a memory page containing the system call table was changed. This change is consistent with the installation of a system call hook, an action often performed by malware and therefore malware-indicative. In another example, opening a Word® document caused an executable file to be written to the hard drive. Such file-dropping is often performed by malware, and may therefore be considered malware-indicative.

When the differential snapshot(s) indicate malicious behavior, a step 660 may take anti-malware action against data sample 30. For instance, step 660 may comprise labeling the respective data sample as malicious and/or alerting a user or a system administrator. In another example, wherein computer security appliance 20 receives data sample 30 from a client system, step 660 may include unit 22 instructing network filter 28 to block electronic communication to or from the respective client system.

In some embodiments, analysis unit 22 may coordinate processing of data sample 30 by sample analysis unit 24, by dynamically receiving and sending signals and/or data from/to hardware components such as video analyzer 26, CPU tap 27, and HID emulator 25, during processing of data sample 30. In one such example, introspection engine may receive a signal from video analyzer 26, the signal indicating that a new window appeared on screen during processing of data sample 30. The signal may determine engine 90 to request a memory scan and/or a processor register scan of execution unit 24. To execute a processor register scan, engine 90 may instruct CPU tap 27 to suspend execution of the processor of unit 24 and to read the current contents of a set of processor registers. To execute a memory scan, engine 90 may request memory shadower 60 to read the content of a set of memory pages, for instance, the content of a critical memory area (e.g., where a driver currently resides, where the system call table resides). Such information may be used by introspection engine 90 to determine whether data sample 30 comprises malware.

Introspection engine 90 may request a memory scan at various times during processing of data sample 30. Such scans may be triggered by various processor events, as illustrated in the above example. Memory scans may also be performed conditionally, as shown by steps 652-658 in FIG. 16. A step 652 verifies whether a scan condition is satisfied, for instance whether a certain time interval has passed since the latest memory scan, or whether a previous memory scan has identified changes in a particular memory area. When the condition is satisfied, engine 90 may instruct memory shadower 60 to read a content of certain critical memory areas. The current content may be compared to a reference content of the respective memory areas, the reference content taken, for instance, from the reference RAM snapshot taken in step 612. Memory changes may then be used to determine whether the currently processed data sample is malicious.

In some embodiments, memory shadower 60 may be configured to automatically check for changes to certain critical memory areas, at regular time intervals (e.g., each second), and send such changes to analysis unit 22. Such automatic checking may provide a timeline of the respective memory changes.

Figure 17:
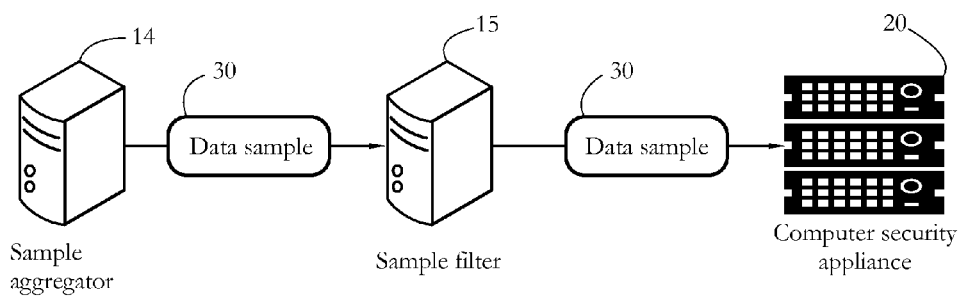
FIG. 17 shows an exemplary embodiment of the present invention, wherein a sample filter is used to pre-filter data samples before transmitting such samples to the computer security appliance.
Figure 18:
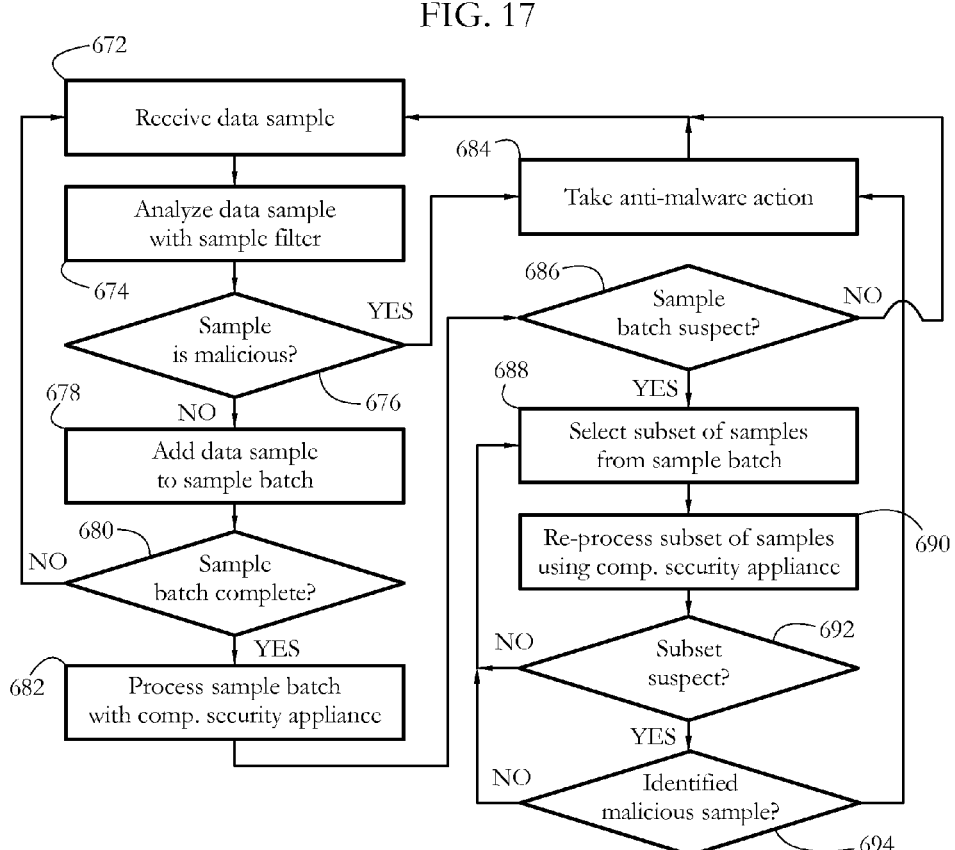
FIG. 18 shows an exemplary sequence of steps performed by the embodiment illustrated in FIG. 17.

FIGS. 17-18 illustrate a manner of using a computer security appliance in conjunction with other malware filters, to increase throughput and/or detection performance. In some embodiments, each data sample is first analyzed using a conventional malware filter 15, including, for instance, a virtual machine farm processing many such data samples in parallel. Filter 15 will likely detect the majority of malicious samples, which are relatively unsophisticated.

Samples not identified as malicious by filter 15 may be further fed to computer security appliance 20. Since the vast majority (e.g., 99.9%) of such samples are malware-free by virtue of being pre-filtered, some embodiments of computer security appliance 20 expedite processing by analyzing such samples in batches. In one such example, illustrated in FIG. 18, a batch of data samples 30 (e.g., 10-100 samples) are simultaneously input into appliance 20. Appliance 20 may process all samples of a batch within one session, opening and/or launching them into execution concurrently and/or sequentially. Appliance 20 may further allow the batch of samples to execute for a predetermined time period, after which changes to the memory and/or disk are analyzed to determine whether the respective batch is suspect of containing malware. Some embodiments rely on the insight that changes made to the memory and/or disk of sample analysis unit 24 by a sophisticated malicious sample are sufficiently specific and unusual, so that they may not be obscured or undone by the actions of other samples executing concurrently as part of the same batch. When changes to memory or storage indicate possible malice, some embodiments divide the respective batch into smaller subsets of samples, and re-analyze such subsets until the malicious sample is positively identified.

Figure 19:
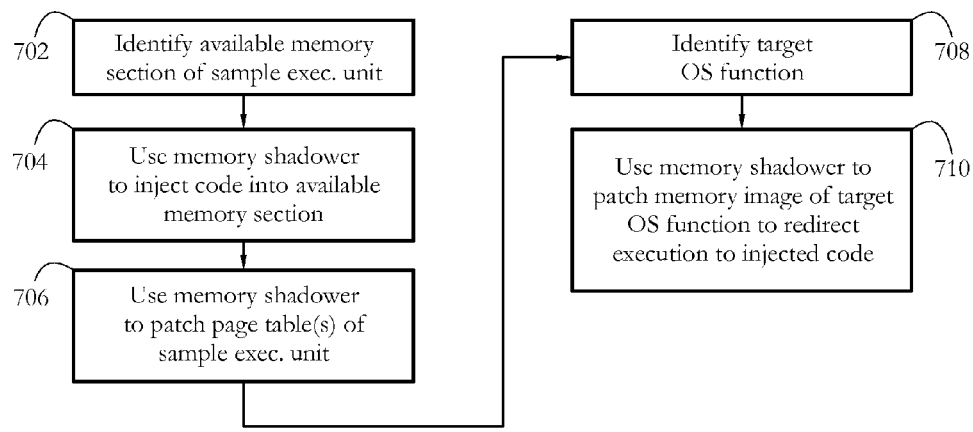
FIG. 19 shows an exemplary sequence of steps performed by the analysis unit to inject code into the sample execution unit, according to some embodiments of the present invention.
Figure 20:
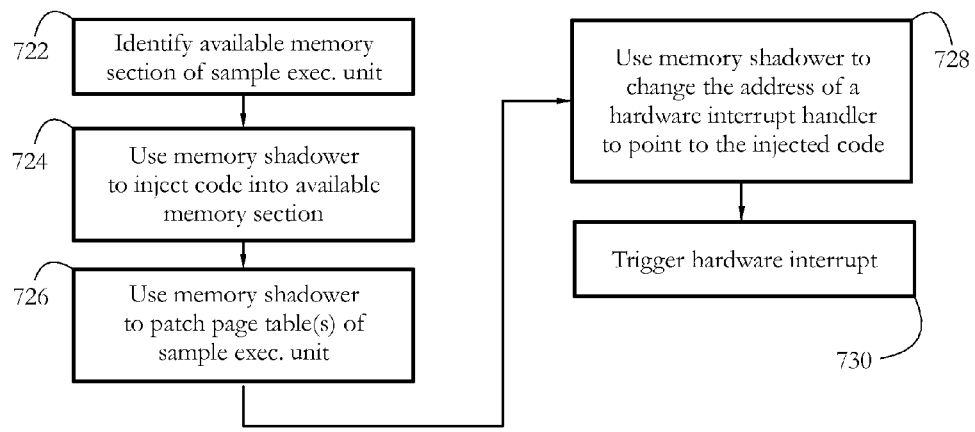
FIG. 20 shows an alternative sequence of steps performed by the analysis unit to inject code into the sample execution unit, according to some embodiments of the present invention.
Figure 21:
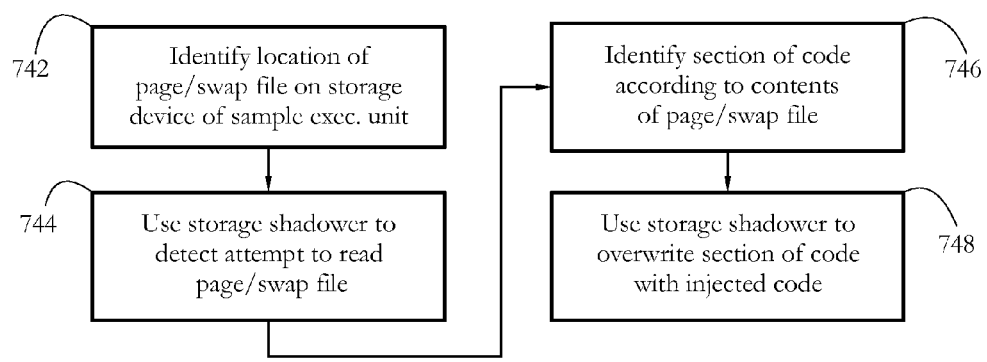
FIG. 21 shows another exemplary sequence of steps performed by the analysis unit to inject code into the sample execution unit, according to some embodiments of the present invention.

FIGS. 19-20-21 illustrate various methods of using memory shadower 60 and/or storage shadower 70 to inject code into sample execution unit 24. In some embodiments, DMA controller 66 of memory shadower 60 (FIG. 8) may be used not only to read data from memory unit 242 of sample analysis unit 24, but also to write data to memory unit 242. Such written data may include executable code, hence using memory shadower 60 to write code into memory unit 242 may amount to injecting code into sample execution unit 24.

Some embodiments employ memory shadower 60 and/or storage shadower 70 to inject a security agent into sample execution unit 24, the agent executing at kernel level or user level of processor privilege. The security agent may perform anti-malware operations within sample execution unit 24, for example, to detect and/or incapacitate malware. Other operations performed by the security agent may include, among others, operations otherwise carried out by introspection engine 90, e.g., determining memory addresses of various OS functions or objects, editing dispatch tables, setting memory access permissions, etc. Such operations may be carried out with the help of the OS, and therefore may carry substantially smaller computational overhead than the one required to carry out similar operations from outside sample execution unit 24. An agent injected according to some embodiments illustrated herein may be virtually impossible to detect by software executing within sample execution unit 24, since it is injected directly from outside unit 24, at hardware level, possibly only for a short period of time, and possibly in a dynamic manner, i.e., only in response to certain trigger events occurring within execution unit 24.

To avoid overwriting code or data used by test OS 54 and/or by other software executing within unit 24 when injecting the security agent, some embodiments may employ introspection engine 90 to identify an unused memory region within memory unit 242. In one example, unused memory space may be found within a memory page containing code/data of a driver object. In another example, introspection engine 90 may identify a memory page not yet allocated by the OS. Upon identifying an unused memory region, analysis unit 22 may instruct memory shadower 60 to employ DMA controller 66 to write the injected code into the respective memory region. To make the respective code accessible for execution, some embodiments may employ shadower 60 to modify (patch) a page table used by software executing within sample execution unit 24, to establish a physical-to-virtual memory translation for the respective memory location.

To force execution of the injected code (e.g., security agent), one can use a variety of methods known in the art. In one example, illustrated by steps 708-710 in FIG. 19, introspection engine 90 may select a target OS function, such as an API function often called by other software components. Examples of such target functions include ExAllocatePoolWithTag and KeWaitForSingleObject in Windows®. After localizing the target function within the memory of sample execution unit 24, analysis unit 22 may instruct memory shadower 60 to overwrite a part of the target function, to redirect execution to the injected code. In another example, illustrated by steps 728-730 in FIG. 20, introspection engine 90 may localize within the memory of execution unit 24 a section of code (handler) used by test OS 54 to handle processor events such as exceptions or hardware interrupts (e.g., non-maskable interrupts—NMI). Then, analysis unit 22 may instruct memory shadower 60 to overwrite an address of the handler in an interrupt descriptor table, the modification directing execution to the injected code instead of the handler. Analysis unit 22 may further trigger a hardware interrupt, for instance a NMI, to trigger execution of the injected code within execution unit 24. Triggering a hardware interrupt may be particularly convenient in an embodiment wherein analysis unit 22 is integrated onto a PCI express card (see e.g., FIGS. 11-12).

To communicate data back to analysis unit 22, the injected security agent may be configured to write to a specific section of the memory of sample execution unit 24, the section selected, for example, by analysis unit 22 prior to injecting the agent. Analysis unit 22 may instruct memory shadower to retrieve the contents of the respective memory section, and thus receive data from the injected agent.

To ensure that the injected security agent is not persistent and therefore is less likely to be detected by malicious software executing within sample analysis unit 24, some embodiments configure the security agent to signal back to analysis unit 22, for instance when their execution is over. The agent may signal the end of execution or some other lifecycle event by writing a particular data item to a predetermined memory section (see above). In an alternative embodiment, for instance wherein memory shadower 60 connects to analysis unit 24 via a PCI slot (e.g., FIGS. 11-12) the injected agent may write a pre-determined value to a hardware register of or used by memory shadower 60, for instance to a PCI configuration space of security card 180. The respective value may signal to memory shadower 60 or to another hardware component that execution of the injected agent has finished. In response to detecting that the injected agent may be removed, analysis unit 22 may instruct memory shadower 60 and/or storage shadower 70 to undo changes brought to sample analysis unit 24 due to execution of the injected agent.

FIG. 21 shows an alternative embodiment, which uses storage shadower 70 to inject code into sample execution unit 24. In a step 742, introspection engine 90 may determine the location (e.g., address) on storage unit 248 of a page/swap file used by unit 24. The swap file may contain code and/or data currently swapped to disk. Storage shadower 70 may intercept an attempt to access the respective swap file, indicating an intent of OS 54 to load the respective data/code into RAM. Upon detecting the access attempt, storage shadower 70 may signal to introspection engine 90, which may identify a section of code within the respective swap file, and may instruct storage shadower 70 to overwrite the respective section of code with the injected code. Following such overwriting, loading the swap file into RAM may also load the injected code into the memory of sample execution unit 24.

The exemplary systems and methods described above enable performing computer security operations, such as detecting malware and spyware, in a bare-metal computer system. In some embodiments, a first processor of a security appliance executes the code samples under assessment, whereas a second, distinct processor is used to carry out the assessment and to control various hardware components involved in the assessment.

In conventional computer security applications such as anti-malware systems, code samples currently undergoing security assessment are typically executed in isolated environments exposed on a host computer system, so as to avoid contaminating the operating system and/or other software executing on the respective host system. Such contamination is possible since both the malicious samples and the analysis software use the same processor and/or the same physical memory for execution. Examples of isolated environments used in computer security applications include emulators (sandboxes), virtual machines, and other kinds of software containers. Virtual machines are commonly known in the art as software emulations of actual physical machines/computer systems, each capable of running its own operating system and software independently of other VMs. Hardware resources of the host system, such as processor operations, memory, storage, input/output, and networking devices may be multiplexed so that multiple virtual machines and/or operating systems (OS) may run concurrently on the respective host system, with various degrees of isolation. In typical VM setups, a hypervisor may set up a plurality of virtualized devices, each virtualized device emulating a physical hardware device of the host system, and may further assign a set of virtual devices to each VM. Thus, each VM operates as if it possesses its own set of physical devices, i.e., as a more or less complete computer system. Executing the assessed samples in such environments may carry a substantial computational overhead required to maintain and operate the respective environment.

Moreover, sophisticated malicious software is becoming more context-aware, being able to detect that it is executing within an isolated environment, instead of on an actual computer system connected to a real network and operated by a human. When detecting that it is currently executing within such an environment, a malicious agent may, for example, stop all malicious activities and therefore go undetected by a conventional automated computer security system.

Exemplary ways in which a malicious agent may detect a virtual machine environment include, among others, detecting certain registry key values, detecting the presence of certain virtualized hardware devices, determining that some CPU operations take substantially longer time to execute than in a bare-metal system (due to virtualization overhead), and detecting that some processor registers, such as MSRs, are virtualized, while others are not. The malicious agent may further detect the presence of a kernel filtering driver, the presence of software components monitoring I/O operations (e.g. disk file creation, registry key access), the presence of user-mode code hooking modules, and the presence of certain assets belonging to an anti-malware solution, among others.

In contrast, some embodiments of the present invention execute the code samples in a testing computer system, which is virtually indistinguishable from an end-user system such as a PC, smartphone, etc. Isolation between the analyzed samples and the analyzing software is enforced at hardware level, by employing distinct physical processors and memories. In some embodiments, a memory shadower and/or a storage shadower are employed to identify changes occurring within the memory and/or storage of the computer system executing the assessed code samples, the changes occurring in response to executing the respective code samples. The separate analysis unit may receive the respective changes from the memory and/or storage shadower(s) and may determine whether the samples are malicious according to the respective changes. Some embodiments may also use the memory and/or storage shadower(s) to inject code (e.g., a security agent) into the computer system executing the assessed samples.

An advanced malicious agent may further determine whether a human operator is interacting with the host environment, indicating that the respective environment is not an automated malware analysis system. The agent may choose not to engage in malicious activities when there is no sign of actual human interaction. Detecting a human presence may include, for instance, detecting input operations and/or patterns, such as certain ways of using a keyboard or a mouse. In another example, the agent may detect whether the host environment exposes any visual output, such as a graphical user interface (GUI) element—popup windows or messages that interrupt execution, waiting for a user response or a choice of a user-selected option to continue execution. To realistically simulate a computer system manipulated by a human operator, some embodiments of the present invention use a human interface device (HID) emulator to inject input events into the computer system executing the samples. In some embodiments, such input events are also used to trigger a transition of the computer system into a sleeping state in order to extract snapshots of the memory and/or storage of the respective computer system.

When some hardware components of analysis unit 22 are integrated onto a PCI card (e.g., card 180 in FIGS. 11-12), the respective card may be visible to the OS of sample execution unit 24, and further to other software components executing within sample execution unit 24. Such software may also include malware, so a malware agent may be able to discover that a security card operates within the respective execution environment. In some embodiments, to avoid such detection, the respective security card may expose a set of null and/or dummy values in its PCI configuration space. Such an approach may trick the OS into assuming, for instance, that the respective card does not exist. The PCI configuration space may be properly configured only at a later time, for instance a few seconds after the OS has finished scanning for hardware. In an alternative approach, the PCI configuration space of the security card may expose a pre-determined set of values, the respective values carefully chosen so to represent another kind of device, for instance a graphics card, a sound card, etc. In yet another embodiment, a hardware or software component of sample execution unit 24 may be configured to alert analysis unit 22 every time software accesses the PCI configuration space of the respective card. Introspection engine 90 may determine whether the respective scan fits within a normal pattern of scanning for hardware, the respective pattern specific to each OS. For example, Windows® kernels typically scan the PCI configuration space only at boot-up and wakeup. When the current hardware scan does not seem consistent with a normal pattern of the OS, engine 90 may decide that the current scan was requested by the sample currently being processed, which may be an indication of malice.

The operating system may have control over the power state (e.g., ACPI state) of hardware devices, including a security card housing components of analysis unit 22 and/or of sample execution unit 24, as shown, for instance, in FIGS. 11-12. A carefully crafted malware agent may attempt to incapacitate computer security appliance 20 by calling a power management function of the OS to power off the respective security card. To prevent such attempts, the respective security board may be configured to receive power via a dedicated connector, either from an external power source, or from a motherboard connector. In some embodiments, analysis unit 22 may detect an attempt to power down the security card, determine whether the attempt is consistent with a normal pattern of operation, and when not, determine that a currently processed data sample is malicious.

When sample analysis unit 24 is configured with a processor and/or controller hub enabling hardware virtualization (such as an Intel® processor configured with the VT-d standard), or when the hardware platform of unit 24 comprises an input-output memory management unit (IOMMU), the OS may alter the way a physical device (e.g. a security PCI card) sees the memory space. In such configurations, a carefully crafted malware agent may attempt to incapacitate computer security appliance 20 by re-directing memory access of the security board. To prevent such attempts, some embodiments of computer security appliance 20 may determine whether the hardware configuration of the host platform, and selectively disable virtualization features such as IOMMU and/or VT-d, or instruct OS 54 not to use them.

Some embodiments of the present invention illustrate a manner of using a computer security appliance in conjunction with other security devices, such as a conventional malware filter. The practice of malware scanning shows that, typically, only a small percentage of analyzed samples (e.g., a few percent) actually contain malware. Furthermore, of the malicious samples, only a small percentage (e.g., 1-2%) contain advanced forms of malware, such as agents which are environment-aware and/or customized to execute only on certain machines and/or in certain networks. Therefore, the vast majority of analyzed samples do not necessarily justify the substantial investment of a dedicated bare-metal computer security appliance. Conventional automated malware analysis systems, employing, for instance, sandboxing or hardware virtualization coupled to various static and/or behavioral filters, are fast and efficient, being able to process hundreds of samples in parallel. Compared to a conventional system, a computer security appliance of similar performance, as described in some embodiments of the present invention, may cost orders of magnitude more in initial investment and running expenses (e.g., energy consumption, cooling, maintenance, etc.).

However, the sophisticated malware which cannot be detected by a conventional malware filter is potentially orders of magnitude more damaging to its target than more naïve malicious agents, which may justify acquisition of a bare-metal computer security appliance. To reach a compromise between speed of analysis and costs, some embodiments of the present invention use a combination of a conventional malware filter and a bare-metal computer security appliance, wherein samples are first analyzed using a conventional solution (e.g., a malware filter wherein the samples execute within a virtual machine). Samples which are deemed clean according to the conventional solution may be fed in batches to the computer security appliance.

It will be clear to a skilled artisan that the above embodiments may be altered in many ways without departing from the scope of the invention. Accordingly, the scope of the invention should be determined by the following claims and their legal equivalents.

What is claimed is:

1. A computer system comprising a first hardware processor, a first memory, a memory shadower, and an interrupt generator, wherein the memory shadower comprises a second memory and logic configured to take snapshots of the first memory, wherein each snapshot comprises a current content of a memory section of the first memory, wherein taking snapshots comprises copying the current content from the first memory to the second memory, wherein the computer system is configured to:

employ the first hardware processor to execute a batch of code samples loaded into the first memory, the batch selected from a corpus prior to loading the batch into the first memory, wherein selecting the batch comprises:

employing a malware filter to determine whether a candidate sample of the corpus is malicious, and in response, when the candidate sample is not malicious according to the malware filter, including the candidate sample into the batch;

employ the interrupt generator to inject a hardware interrupt into the first hardware processor, the hardware interrupt causing the computer system to transition into a sleeping state, wherein the sleeping state is a state wherein the first hardware processor is not executing instructions and the first memory is powered;

in response to the computer system transitioning into the sleeping state, employ the memory shadower to take a first snapshot of the first memory; and in response to taking the first snapshot, employ the memory shadower to transmit at least a part of the first snapshot to a second hardware processor, wherein the second hardware processor is configured to:

determine whether the first snapshot is indicative of malicious activity resulting from executing the batch of code samples, and in response, when the first snapshot is not indicative of malicious activity, determine that no sample of the batch is malicious.

2. The computer system of claim 1, wherein the second hardware processor is further configured, when the first snapshot is indicative of malicious activity, to:

select a subset of code samples from the batch;
instruct the first hardware processor to execute the subset of code samples;
instruct the interrupt generator to inject a second hardware interrupt into the first hardware processor, the second hardware interrupt causing the computer system to transition into the sleeping state;
in response to the computer system transitioning into the sleeping state, instruct the memory shadower to take a second snapshot of the first memory;
determine whether the second snapshot is indicative of malicious activity resulting from executing the subset of code samples; and
in response, when the second snapshot is not indicative of malicious activity, determine that none of the subset of code samples is malicious.

3. The computer system of claim 2, wherein the second hardware processor is further configured to identify a malicious code sample of the batch according to whether the second snapshot is indicative of malicious activity.

4. The computer system of claim 1, wherein selecting the batch further comprises, in response to including the candidate sample into the batch, determining whether a batch accumulation condition is satisfied, and instructing the computer system to load the batch into the first memory only when the batch accumulation condition is satisfied.

5. The computer system of claim 1, wherein transitioning to the sleeping state comprises the first hardware processor saving a current state of the first hardware processor to the first memory before entering the sleeping state.

6. The computer system of claim 1, wherein transitioning to the sleeping state comprises at least partially powering down the first hardware processor.

7. The computer system of claim 1, wherein taking snapshots comprises:

employing the memory shadower to compare the current content to a reference content, and
in response, employing the memory shadower to write the current content to the second memory only when the current content differs from the reference content.

8. The computer system of claim 1, further configured to employ the memory shadower to take a baseline snapshot of the first memory prior to the first hardware processor starting to execute the batch of code samples, and wherein determining whether the first snapshot is indicative of malicious activity comprises comparing the first snapshot to the baseline snapshot.

9. The computer system of claim 8, further configured, in response to the second hardware processor determining whether the first snapshot is indicative of malicious activity, to:

stop executing the batch of code samples; and
in response to stopping execution of the batch, employ the memory shadower to restore a content of the baseline snapshot to the memory section.

10. The computer system of claim 1, wherein the malware filter executes within a virtual machine.

11. A method comprising:

assembling a sample batch comprising a plurality of code samples selected from a corpus, wherein assembling the sample batch comprises:
employing a malware filter to determine whether a candidate sample of the corpus is malicious, and
in response, when the candidate sample is not malicious according to the malware filter, including the candidate sample into the sample batch;
in response to assembling the sample batch, employing a first hardware processor to instruct a computer system to load the sample batch into a first memory of the computer system, the computer system further comprising a second hardware processor configured to execute the sample batch, the computer system further comprising a memory shadower and an interrupt generator, wherein the memory shadower comprises a second memory and logic configured to take snapshots of the first memory, wherein each snapshot comprises a current content of a memory section of the first memory, wherein taking snapshots comprises copying the current content from the first memory to the second memory;
employing the first hardware processor to instruct the interrupt generator to inject a hardware interrupt into the second hardware processor, the hardware interrupt causing the computer system to transition into a sleeping state, wherein the sleeping state is a state wherein the second hardware processor is not executing instructions and the first memory is powered;
in response to the computer system transitioning into the sleeping state, employing the first hardware processor to instruct the memory shadower to take a first snapshot of the first memory;
employing the first hardware processor to determine whether the first snapshot is indicative of malicious activity resulting from executing the sample batch; and
in response, when the first snapshot is not indicative of malicious activity, employing the first hardware processor to determine that none of the plurality of code samples is malicious.

12. The method of claim 11, further comprising, when the first snapshot is indicative of malicious activity, employing the first hardware processor to:

select a subset of code samples from the sample batch;
instruct the second hardware processor to execute the subset of code samples;
instruct the interrupt generator to inject a second hardware interrupt into the second hardware processor, the second hardware interrupt causing the computer system to transition into the sleeping state;
in response to the computer system transitioning into the sleeping state, instruct the memory shadower to take a second snapshot of the first memory;
determine whether the second snapshot is indicative of malicious activity resulting from executing the subset of code samples; and in response, when the second snapshot is not indicative of malicious activity, determine that none of the subset of code samples is malicious.

13. The method of claim 12, further comprising identifying a malicious code sample of the sample batch according to whether the second snapshot is indicative of malicious activity.

14. The method of claim 11, further comprising, in response to including the candidate sample into the sample batch, determining whether a batch accumulation condition is satisfied, and instructing the computer system to load the sample batch into the first memory only when the batch accumulation condition is satisfied.

15. The method of claim 11, wherein transitioning to the sleeping state comprises the second hardware processor saving a current state of the second hardware processor to the first memory before entering the sleeping state.

16. The method of claim 11, wherein transitioning to the sleeping state comprises at least partially powering down the second hardware processor.

17. The method of claim 11, wherein taking snapshots comprises:

employing the memory shadower to compare the current content to a reference content, and in response, employing the memory shadower to write the current content to the second memory only when the current content differs from the reference content.

18. The method of claim 11, further comprising instructing the memory shadower to take a baseline snapshot of the first memory prior to the second hardware processor starting to execute the sample batch, and wherein determining whether the first snapshot is indicative of malicious activity comprises comparing the first snapshot to the baseline snapshot.

19. The method of claim 18, further comprising, in response to determining whether the first snapshot is indicative of malicious activity:

instructing the second hardware processor to stop executing the sample batch; and in response, instructing the memory shadower to restore a content of the baseline snapshot to the memory section.

20. The method of claim 11, wherein the malware filter executes within a virtual machine.

* * * * *